United States Patent
Helmrich et al.

(10) Patent No.: US 11,973,988 B2
(45) Date of Patent: Apr. 30, 2024

(54) ENCODER, DECODER, METHODS AND COMPUTER PROGRAMS FOR AN IMPROVED LOSSLESS COMPRESSION

(71) Applicant: Fraunhofer-Gesellschaft zur Foerderung der angewandten Forschung e.V., Munich (DE)

(72) Inventors: Christian Helmrich, Berlin (DE); Benjamin Bross, Berlin (DE); Tung Hoang Nguyen, Berlin (DE); Heiko Schwarz, Berlin (DE); Detlev Marpe, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 238 days.

(21) Appl. No.: 17/568,486

(22) Filed: Jan. 4, 2022

(65) Prior Publication Data

US 2022/0132169 A1 Apr. 28, 2022

Related U.S. Application Data

(63) Continuation of application No. PCT/EP2020/068672, filed on Jul. 2, 2020.

(30) Foreign Application Priority Data

Jul. 5, 2019 (EP) .................................. 19184790

(51) Int. Cl.
*H04N 19/70* (2014.01)
*H04N 19/117* (2014.01)
(Continued)

(52) U.S. Cl.
CPC ........... *H04N 19/70* (2014.11); *H04N 19/117* (2014.11); *H04N 19/12* (2014.11); *H04N 19/124* (2014.11);
(Continued)

(58) Field of Classification Search
CPC ...... H04N 19/70; H04N 19/117; H04N 19/12; H04N 19/124; H04N 19/13; H04N 19/172; H04N 19/61; H04N 19/176
(Continued)

(56) References Cited

U.S. PATENT DOCUMENTS

| 2013/0077696 A1 | 3/2013 | Zhou | |
| 2020/0137385 A1* | 4/2020 | Jiang | H04N 19/139 |
| 2021/0243474 A1* | 8/2021 | Ichigaya | H04N 19/124 |

FOREIGN PATENT DOCUMENTS

| JP | 2008104072 A | 5/2008 |
| WO | 2013166395 A2 | 11/2013 |

OTHER PUBLICATIONS

Kim, Seung-Hwan, et al.; "Simplified CABAC for Lossless Compression"; JCTVC-H0499; Feb. 1-10, 2012; 8 pages.
(Continued)

*Primary Examiner* — Allen C Wong
(74) *Attorney, Agent, or Firm* — Conley Rose, P.C.

(57) ABSTRACT

Decoder for decoding a picture from a data stream, configured to check whether a plurality of coding parameters, which are contained in the data stream, relate to a predetermined portion of the picture and control a prediction residual transform mode and a quantization accuracy with respect to the predetermined portion, are indicative of a coding parameter setting corresponding to a lossless prediction residual coding. Responsive to the plurality of coding parameters being indicative of the coding parameter setting corresponding to the lossless prediction residual coding, the decoder is
(Continued)

configured to set one or more predetermined coding options relating to one or more tools of the decoder for processing a prediction residual corrected predictive reconstruction with respect to the predetermined portion so that the one or more tools are disabled with respect to the predetermined portion.

16 Claims, 13 Drawing Sheets

(51) Int. Cl.
  *H04N 19/12*    (2014.01)
  *H04N 19/124*   (2014.01)
  *H04N 19/13*    (2014.01)
  *H04N 19/172*   (2014.01)
  *H04N 19/61*    (2014.01)
  *H04N 19/176*   (2014.01)

(52) U.S. Cl.
  CPC ........... *H04N 19/13* (2014.11); *H04N 19/172* (2014.11); *H04N 19/61* (2014.11); *H04N 19/176* (2014.11)

(58) Field of Classification Search
  USPC .................................................... 375/240.03
  See application file for complete search history.

(56) References Cited

OTHER PUBLICATIONS

Xiu, Xiaoyu, et al.; "Text HLS: On Lossless Coding"; JCTVC-Q0106-v2; Mar. 27-Apr. 4, 2014; 3 pages.

Auwera, Geer Van Der, et al.; "Lossless Coding and Loop Filter Control for Transform Skip"; JCTVC-J0435; Jul. 11-20, 2012; 3 pages.

International Search Report and Written Opinion received in Patent Cooperation Treaty Application No. PCT/EP2020/068672, dated Nov. 12, 2020.

Lan, Cuiling, et al., "Lossless Coding Via Transform Skipping", JCTVC-J0238, 10th Meeting: Stockholm, Sweden, Jul. 11-20, 2012.

Peng, Xiulian, et al., "Inter Transform Skipping", JCTVC-J0237, 10th Meeting: Stockholm, Sweden, Jul. 11-20, 2012.

Examination Report received in Indian Application No. 202237000201, dated Jun. 28, 2022.

\* cited by examiner

ENCODER, DECODER, METHODS AND COMPUTER PROGRAMS FOR AN IMPROVED LOSSLESS COMPRESSION

CROSS-REFERENCES TO RELATED APPLICATIONS

This application is a continuation of copending International Application No. PCT/EP2020/068672, filed Jul. 2, 2020, which is incorporated herein by reference in its entirety, and additionally claims priority from European Application No. EP 19 184 790.4, filed Jul. 5, 2019, which is incorporated herein by reference in its entirety.

Embodiments according to the invention related to an encoder, a decoder, methods and computer programs for an improved lossless compression. The present invention relates to Extensions for lossless compression in modern hybrid image and video coding solutions.

In the following, different inventive embodiments and aspects will be described. Also, further embodiments will be defined by the enclosed claims.

It should be noted that any embodiments as defined by the claims can be supplemented by any of the details (features and functionalities) described in the following different inventive embodiments and aspects.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in an encoder (apparatus for providing an encoded representation of an input signal) and in a decoder (apparatus for providing a decoded representation of a signal on the basis of an encoded representation). Thus, any of the features described herein can be used in the context of an encoder and in the context of a decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

BACKGROUND OF THE INVENTION

In state-of-the-art lossy video compression, the encoder quantizes the prediction residual or the transformed prediction residual using a specific quantization step size $\Delta$. The smaller the step size, the finer the quantization and the smaller the error between original and reconstructed signal. Recent video coding standards (such as H.264 and H.265) derive that quantization step size $\Delta$ using an exponential function of a so-called quantization parameter (QP), e.g.:

$$\Delta(QP) \approx const \cdot 2^{\frac{QP}{6}}$$

The exponential relationship between quantization step size and quantization parameter allows a finer adjustment of the resulting bit rate. The decoder needs to know the quantization step size to perform the correct scaling of the quantized signal. This stage is sometimes referred to as "inverse quantization" although quantization is irreversible. That is why the decoder parses the scaling factor or QP from the bitstream. The QP signalling is typically performed hierarchically, i.e. a base QP is signalled at a higher level in the bitstream, e.g. at picture level. At sub-picture level, where a picture can consist of multiple slices, tiles or bricks, only a delta to the base QP is signalled. In order to adjust the bitrate at an even finer granularity, a delta QP can even be signalled per block or area of blocks, e.g. signaled in one transform unit within an N×N area of coding blocks in HEVC. Encoders usually use the delta QP technique for subjective optimization or rate-control algorithms. Without loss of generality, it is assumed in the following that the base unit in the presented invention is a picture, and hence, the base QP is signalled by the encoder for each picture consisting of a single slice. In addition to this base QP, also referred to as slice QP, a delta QP can be signalled for each transform block (or any union of transform block, also referred to as quantization group).

State-of-the-art video coding schemes, such as High Efficiency Video Coding (HEVC), or the upcoming Versatile Video Coding (VVC) standard, optimize the energy compaction of various residual signal types by allowing additional transforms beyond widely used integer approximations of the type II discrete cosine transform (DCT-II). The HEVC standard further specifies an integer approximation of the type-VII discrete sine transform (DST-VII) for 4×4 transform blocks using specific intra directional modes. Due to this fixed mapping, there is no need to signal whether DCT-II or DST-VII is used. In addition to that, the identity transform can be selected for 4×4 transform blocks. Here the encoder needs to signal whether DCT-II/DST-VII or identity transform is applied. Since the identity transform is the matrix equivalent to a multiplication with 1, it is also referred to as transform skip. Furthermore, the current VVC development allows the encoder to select more transforms of the DCT/DST family for the residual as well as additional non-separable transforms, which are applied after the DCT/DST transform at the encoder and before the inverse DCT/DST at the decoder. Both, the extended set of DCT/DST transforms and the additional non-separable transforms, may use additional signalling per transform block.

FIG. 1b illustrates the hybrid video coding approach with forward transform and subsequent quantization of the residual signal 24 at the encoder 10, and scaling of the quantized transform coefficients followed by inverse transform for the decoder 36. The transform and quantization related blocks 28/32 and 52/54 are highlighted.

Modern image and video coding solutions such as High Efficiency Video Coding (HEVC, H.265, ISO/IEC 23008-3) and the currently developed Versatile Video Coding (VVC, H.266) allow to efficiently compress still or moving picture content even at very low bit-rates. The typical use case of these codec (coder-decoder) solutions is the lossy compression of high-resolution video material for broadcasting (e.g., television) and streaming (e.g., video-over-IP) applications. Nonetheless, the codecs also support lossless compression, thus allowing mathematically perfect reconstruction of the coded input signals upon decoding. More specifically, HEVC provides several pulse code modulation (PCM) related coding tools as well as a so-called transquant bypass coding mode, which facilitates lossless coding by simplifying the entropy coding process and by disabling the quantization, transform (DCT or DST), and deblocking steps. Details can be found in the HEVC syntax and decoding specification which is publicly available [1].

In the current version of VVC, the successor of HEVC under development, the lossless coding functionality of HEVC has largely been taken over, at least in the reference coding and decoding software [2]. This means that both the PCM related coding tools as well as the transform quantization bypass coding mode are available for activation by both HEVC encoders and current VVC reference encoder. Moreover, the transform quantization bypass coding flag (a 1-bit syntax element) is specified not only for an entire bit-stream or picture (frame) of a bit-stream but for individual subblocks (coding units, CUs or transform units, TUs) of said bit-stream or frame. In other words, in both HEVC and VVC, transform quantization bypass coding can be enabled on a subblock basis, thus allowing to disable the quantization, transform, and deblocking coding tools individually per subblock.

Recently, a contribution to the VVC standardization activity within JVET as described above has been introduced, which corrects a particular lossless coding related shortcoming of the transform skip coding functionality in the current VVC draft, which also exists in HEVC and which specifies that, for a given coding subblock (CU or TU), the inverse residual coefficient transform operation (inverse DCT or DST) is bypassed. More specifically, the contribution proposes to restrict the quantization step-size, governed by a quantization parameter (QP), to a value greater than or equal to one (represented by a QP of 4) in case of activated transform skipping in a subblock. As a result, with a QP of 4 and disabled in-loop filtering in the spatial area covered by said subblock, lossless coding can be achieved when transform skipping is activated. This behavior, however, is identical to the use of the transform quantization bypass coding mode, as quantization with QP=4 (i. e., unity step-size) effectively represents the bypassing of the quantization algorithm.

Moreover, to reach lossless coding with acceptably low bit-rate using VVC or any other video codec with similar loss coding functionality and tool sets, it may be useful to alter the behavior of some other newly introduced coding tools, which are not available in HEVC and previous video coding standards. Specifically, it may be desirable to disable the newly introduced adaptive loop filter (ALF) and reshaper tools,
the matrix of the joint inter-chroma transform [3] needs to be changed to allow lossless coding.

It is the objective of the present invention to provide a solution for the abovementioned two drawbacks of redundant lossless coding ability (regarding transform quantization bypass and transform skipping functionality) and the necessity of modifying behavioral details of some coding tools when lossless coding is desired.

SUMMARY

According to an embodiment, a decoder for decoding a picture from a data stream may be configured to: check whether a plurality of coding parameters, which are included in the data stream, relate to a predetermined portion of the picture and control a prediction residual transform mode and a quantization accuracy with respect to the predetermined portion, are indicative of a coding parameter setting corresponding to a lossless prediction residual coding, responsive to the plurality of coding parameters being indicative of the coding parameter setting corresponding to the lossless prediction residual coding, setting one or more predetermined coding options relating to one or more tools of the decoder for processing a prediction residual corrected predictive reconstruction with respect to the predetermined portion so that the one or more tools are disabled with respect to the predetermined portion.

According to another embodiment, a method for decoding a picture from a data stream may have the steps of: checking whether a plurality of coding parameters, which are included in the data stream, relate to a predetermined portion of the picture and control a prediction residual transform mode and a quantization accuracy with respect to the predetermined portion, are indicative of a coding parameter setting corresponding to a lossless prediction residual coding, responsive to the plurality of coding parameters being indicative of the coding parameter setting corresponding to the lossless prediction residual coding, setting one or more predetermined coding options relating to one or more tools of the decoder for processing a prediction residual corrected predictive reconstruction with respect to the predetermined portion so that the one or more tools are disabled with respect to the predetermined portion.

According to another embodiment, a non-transitory digital storage medium having a computer program stored thereon to perform the method for decoding a picture from a data stream may have the steps of: checking whether a plurality of coding parameters, which are included in the data stream, relate to a predetermined portion of the picture and control a prediction residual transform mode and a quantization accuracy with respect to the predetermined portion, are indicative of a coding parameter setting corresponding to a lossless prediction residual coding, responsive to the plurality of coding parameters being indicative of the coding parameter setting corresponding to the lossless prediction residual coding, setting one or more predetermined coding options relating to one or more tools of the decoder for processing a prediction residual corrected predictive reconstruction with respect to the predetermined portion so that the one or more tools are disabled with respect to the predetermined portion, when said computer program is run by a computer.

In accordance with a first aspect of the present invention, the inventors of the present application realized that one problem encountered when trying to improve a lossless coding of a picture or a video stems from the fact that some tools of a decoder or encoder, like adaptive loop filter (ALF) and reshaper tools, result in a lossy coding. According to the first aspect of the present application, this difficulty is overcome by disabling one or more tools for processing a prediction residual corrected predictive reconstruction to avoid a loss of information after a lossless reconstruction of a predetermined portion of a picture. In other words, post reconstruction modifications of samples of the predetermined portion of a picture are disabled. Additionally, the first aspect is based on the idea that the one or more tools can be disabled for lossless coding without the necessity of a syntax element indicating a lossless prediction residual coding for the predetermined portion of the picture. The decoder and encoder may be configured to infer that the lossless prediction residual coding is to be used for the predetermined portion of the picture based on the plurality of coding parameters contained in a data stream, whereby no explicit signaling of the lossless coding is necessary. The decoder is configured to advantageously switch between lossless coding and lossy coding for individual portions of a picture. No additional signaling indicating lossless coding for the individual portions of the picture is necessary. This results in a reduced amount of data to be encoded and in a reduced amount of data used to decode the predetermined portion of the picture. An improved lossless coding compression can be achieved. It is possible that the data stream comprises a lossless coding syntax element which indicates whether a predetermined region of the picture or the whole picture is coded using lossless coding, but it is no longer necessary that the data stream comprises for each portion of the picture the lossless coding syntax element. This is due to the ability of the decoder and/or encoder to check whether coding parameter indicate the lossless prediction residual coding. Furthermore, it was found, that a higher coding efficiency and a reduced bit rate can be achieved by combining the disabling of one or more tools of a decoder or encoder and the checking whether the plurality of coding parameters is indicative of a coding parameter setting corresponding to a lossless prediction residual coding.

Accordingly, in accordance with a first aspect of the present application, a decoder for decoding a picture from a data stream, is configured to check whether a plurality of coding parameters, e.g., a quantization parameter (QP) and/or a transform mode (TM), which are contained in the data stream, relate to a predetermined portion of the picture and control a prediction residual transform mode and a quantization accuracy with respect to the predetermined portion, are indicative of a coding parameter setting corresponding to a lossless prediction residual coding. Such a coding parameter setting corresponding to a lossless prediction residual coding is, e.g., represented by (QP, TM)=(4, transform skip) or (QP, TM)=(1 ... 4, transform skip). The coding parameter setting corresponds to the lossless prediction residual coding either because such a coding is immediately signaled by the coding parameter setting or by leading to such a coding by the decoder being configured to interpret or change such a coding parameter setting to the coding parameter setting leading to lossless residual coding, such as mapping of a quantization parameter smaller than four (QP<4) to a quantization parameter equal to four (QP=4) in case of the transform mode being transform skip. This interpretation or change of a coding parameter setting may be based on the plurality of coding parameters. The decoder may be configured to derive from the plurality of coding parameters whether lossy or lossless prediction residual coding is to be used for the predetermined portion of the picture. Responsive to the plurality of coding parameters being indicative of the coding parameter setting corresponding to the lossless prediction residual coding, the decoder is configured to set one or more predetermined coding options relating to one or more tools, e.g., deblocking, sample adaptive offset filtering (SAO) and/or adaptive loop filtering (ALF), of the decoder for processing a prediction residual corrected predictive reconstruction with respect to the predetermined portion so that the one or more tools are disabled with respect to the predetermined portion.

Parallel to the decoder an encoder for encoding a picture into a data stream, is configured to signal a plurality of coding parameters in the data stream and check whether the plurality of coding parameters, which relate to a predetermined portion of the picture and control a prediction residual transform mode and a quantization accuracy with respect to the predetermined portion, are indicative of a coding parameter setting corresponding to a lossless prediction residual coding. Responsive to the plurality of coding parameters being indicative of the coding parameter setting corresponding to the lossless prediction residual coding, the encoder is configured to set one or more predetermined coding options relating to one or more tools of the encoder for processing a prediction residual corrected predictive reconstruction with respect to the predetermined portion so that the one or more tools are disabled with respect to the predetermined portion in a prediction-loop of the encoder.

In accordance with a second aspect of the present invention, the inventors of the present application realized that one problem encountered when trying to improve a lossless coding of a picture or a video stems from the fact that lossless coding typically produces significant higher bitrates compared to lossy coding. According to the second aspect of the present application, this difficulty is overcome by using different codes in binarization for lossless coding and lossy coding. It is possible to switch between different binarizations for lossless coding and lossy coding. It was found that a binarization with a reduced computational complexity with respect to the binarization in the lossy case reduces significantly the bitrates for the lossless coding. The computational complexity, for example, is reduced by coding more bins using an equi-probability bypass mode instead of a regular coding mode in CABAC that uses context modelling and binary arithmetic coding, in case of lossless coding compared to lossy coding. Thus processing bottlenecks can be prevented.

Accordingly, a second aspect of the present application is related to a decoder for decoding a picture from a data stream and an encoder for encoding a picture into a data stream. The decoder (encoder), is configured to determine for a predetermined portion of the picture, whether same is (to be) coded into the data stream using lossless coding or lossy coding. The decoder (encoder) is configured to decode (encode) a prediction residual from (into) the data stream for the predetermined portion using binarization of prediction residual data into bin strings and context-adaptive binary entropy decoding (encoding) of the bin strings in a first manner, if the predetermined portion of the picture is (to be) coded into the data stream using lossless coding, and in a second manner, if the predetermined portion of the picture is (to be) coded into the data stream using lossy coding. The first and second manners differ so that a computational complexity is reduced in the first manner compared to the second manner.

In accordance with a third aspect of the present invention, the inventors of the present application realized that one problem encountered when trying to improve a lossless coding of a picture or a video stems from the fact that a transformation by an encoder or an inverse transformation by a decoder may use rounding-to-integer steps forbidding a mathematically perfect reconstruction of a picture or a portion of the picture. Thus currently the transformation process is bypassed or disabled for lossless coding. According to the third aspect of the present application, this difficulty is overcome by using a perfectly invertible transform for lossless coding. The decoder/encoder is configured to switch between different transform modes for lossless coding and lossy coding. With the perfectly invertible transform a lossless coding can be achieved, since no rounding errors occur. The perfectly invertible transform is, for example, an inter-component transform or a spectrally decomposing intra-color-component transform. There might be additional syntax elements that may be used in the data stream to indicate and/or control the perfectly invertible transform, but it was found that the bitrate can be significantly reduced, whereby the efficiency of the coding can be increased.

Accordingly, a third aspect of the present application is related to a decoder for decoding a picture from a data stream and an encoder for encoding a picture into a data stream. The decoder (encoder), is configured to determine for a predetermined portion of the picture, whether same is (to be) coded into the data stream using lossless coding or lossy coding. The decoder (encoder) is configured to perform on a prediction residual or a prediction residual corrected reconstruction (e.g. in a prediction-loop of the encoder) of the predetermined portion a perfectly invertible transform, if the predetermined portion of the picture is (to be) coded into the data stream using lossless coding, and a non-perfectly invertible transform, if the predetermined portion of the picture is (to be) coded into the data stream using lossy coding.

In accordance with a fourth aspect of the present invention, the inventors of the present application realized that one problem encountered when trying to improve a lossless coding of a picture or a video stems from the fact that smoothing filters result in a loss of information. According to the fourth aspect of the present application, this difficulty is overcome by disabling the filtering or by reducing a filtering used to obtain a prediction signal compared to a lossy coding for a portion of a picture which is to be decoded or encoded lossless. The disabling of the filtering for the portion results in no filtering related syntax elements in the data stream, whereby an improved bit stream compression can be achieved. Alternatively, a prediction signal for the portion of the picture is less filter in the lossless coding case compared to the lossy coding case. In case of lossless coding, for example, an interpolation filter can be applied, wherein a higher frequency half out of an overall spatial frequency spectrum of the prediction signal has higher energy in case of lossless coding than in case of lossy coding. This is based on the idea that it is advantageous to alter the prediction signal in case of lossless coding as little as possible at the derivation of the prediction signal. It was found that the special filtering option for lossless coding, resulting in a higher information content of the prediction signal, results in a reduced bitrate and thus in a high efficiency.

Accordingly, a fourth aspect of the present application is related to a decoder for decoding a picture from a data stream and an encoder for encoding a picture into a data stream. The decoder (encoder), is configured to determine for a predetermined portion of the picture, whether same is (to be) coded into the data stream using lossless coding or lossy coding. The decoder (encoder) is configured to derive a prediction signal for the predetermined portion in a first manner, if the predetermined portion of the picture is (to be) coded into the data stream using lossless coding, and in a second manner, if the predetermined portion of the picture is (to be) coded into the data stream using lossy coding. The first and second manners differ so that the prediction signal is less filtered, e.g. by using an interpolation filter, in the first manner than in the second manner or unfiltered in the first manner while being filtered in the second manner.

In accordance with a fifth aspect of the present invention, the inventors of the present application realized that one problem encountered when trying to improve a lossless coding of a picture or a video stems from the fact that in-loop filters and/or quantization result in a loss of information. According to the fifth aspect of the present application, this difficulty is overcome by disabling one or more tools of the decoder/encoder for processing a prediction residual corrected predictive reconstruction with respect to the predetermined portion and/or by disabling one or more tools of the decoder/encoder for prediction residual re-quantization/quantization. The disabling of the tools for the portion results in no or a reduced amount of postprocessing related syntax elements and/or (re-)quantization related syntax elements in the data stream, whereby an improved bit stream compression can be achieved.

Accordingly, a fifth aspect of the present application is related to a decoder for decoding a picture from a data stream and an encoder for encoding a picture into a data stream. The decoder (encoder), is configured to determine for a predetermined portion of the picture, whether same is (to be) coded into the data stream using lossless coding or lossy coding. The decoder (encoder) is configured to infer that one or more predetermined coding options relating to one or more tools of the decoder (encoder) for processing a prediction residual corrected predictive reconstruction (e.g. in a prediction-loop of the encoder) with respect to the predetermined portion and/or for prediction residual re-quantization (quantization) are to be set so that the one or more tools are disabled with respect to the predetermined portion, if the predetermined portion of the picture is (to be) coded into the data stream using lossless coding, and by deriving the one or more predetermined coding options from the plurality of coding parameters, if the predetermined portion of the picture is (to be) coded into the data stream using lossy coding.

In accordance with a sixth aspect of the present invention, the inventors of the present application realized that one problem encountered when trying to improve a lossless coding of a picture or a video stems from the fact that a difference between a bit-depth, i.e. an input bit-depth, associated with a video to be encoded or associated with a video to be output by a decoder and an internal bit-depth results in a loss of information. According to the sixth aspect of the present application, this difficulty is overcome by performing a bit-depth transition. Therefore, either the input bit-depth or the difference between the input bit-depth and the internal bit-depth is encoded into a data stream by an encoder and read from the data stream by a decoder. Alternatively, the input bit-depth or the aforementioned difference can be indicated by one or more coding parameters, like a quantization parameter (QP). With the information about the input bit-depth or the difference, the decoder is configured to output the video at the input bit-depth, whereby the bit depth of the video output equals the bit-depth of the video input encoded by the encoder. Thus lossless coding can be achieved. No additional syntax element is necessary in case of the bit-depth being indicated by the one or more parameters, whereby an improved bit stream compression can be achieved. Note that the input bit-depth—having its name from the fact that the input bit-depth is the one at which the encoder receives the video for encoding—which is the bit-depth at which the decoder is to output the video, needs not to be unequal to the internal bit-depth, but that the encoder and decoder allow for different settings in the data stream which may include one where both bit-depths are the same and one or more where this is not the case.

Accordingly, a sixth aspect of the present application is related to a video decoder and a video encoder. The decoder, is configured to perform video decoding from a data stream at an internal bit-depth and output a video at an input bit-depth or internal bit-depth. Parallel to the decoder, the encoder is configured to perform video encoding into the data stream at the internal bit-depth and receive video input at the input bit-depth or the internal bit-depth. The output video and/or the input video, for example, are associated with the internal bit-depth in case of the bit-depth of the input video and/or output video, i.e. the input bit-depth, being equal to the internal bit-depth. Additionally, the decoder (encoder) is configured to read (encode) from (into)

the data stream a syntax element which indicates the input bit-depth and/or a difference between the internal bit-depth and the input bit-depth.

Accordingly, a sixth aspect of the present application is related to a video decoder configured to perform video decoding from a data stream at an internal bit-depth and output a video at an input bit-depth or the internal bit-depth. Parallel to the video decoder, a video encoder is configured to perform video encoding into the data stream at the internal bit-depth and receive video input at the input bit-depth or the internal bit-depth. The output video and/or the input video, for example, are associated with the internal bit-depth in case of the bit-depth of the input video and/or output video, i.e. the input bit-depth, being equal to the internal bit-depth. Additionally, the decoder (encoder) is configured to read (encode) from (into) the data stream a syntax element which indicates a minimum for a quantization step size scale parameter (QP minimum), i.e. an absolute or relative quantization step size, re-quantization step size or scaling parameter. The minimum quantization step size scale parameter may represent a unity-step size, i.e. a quantization parameter equal to four. The syntax element, for example, indicates the minimum for a quantization step size scale parameter owing to a difference of non-zero between the internal bit-depth and the input bit-depth. The decoder might be informed of this difference between the internal bit-depth and the input bit-depth as well, e.g., in addition to the QP minimum, either by way of transmitting the difference as described above, or by transmitting both values, i.e. the internal bit-depth and the input bit-depth. Another QP than four may result in, or almost in, lossless coding. A QP smaller than four may be adapted by the decoder to a QP equaling 4 if the QP minimum is set to four resulting in a lossless coding.

Accordingly, a sixth aspect of the present application is related to a video decoder (encoder) configured to decode (encode) from (into) a data stream an indication of an internal bit-depth and an input bit-depth or a difference between same and perform video decoding (encoding) from (into) the data stream at the internal bit-depth. Additionally, the decoder is configured to output a video at the input bit-depth and the encoder is configured to receive the video, i.e. video input, at the input bit-depth. The decoder (encoder) is configured to check whether the internal bit-depth falls below the input bit-depth and change the internal bit-depth to correspond to the input bit-depth. Thus a difference between the input bit-depth and the internal bit-depth is corrected and a lossless coding is achieved.

Embodiments are related to methods based on the same considerations as the above-described encoder and/or decoder. The methods can, by the way, be completed with all features and functionalities, which are also described with regard to the encoder and/or decoder.

An embodiment is related to a computer program having a program code for performing, when running on a computer, a herein described method.

An embodiment is related to a data stream obtained by a method for block-based encoding of a picture signal.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
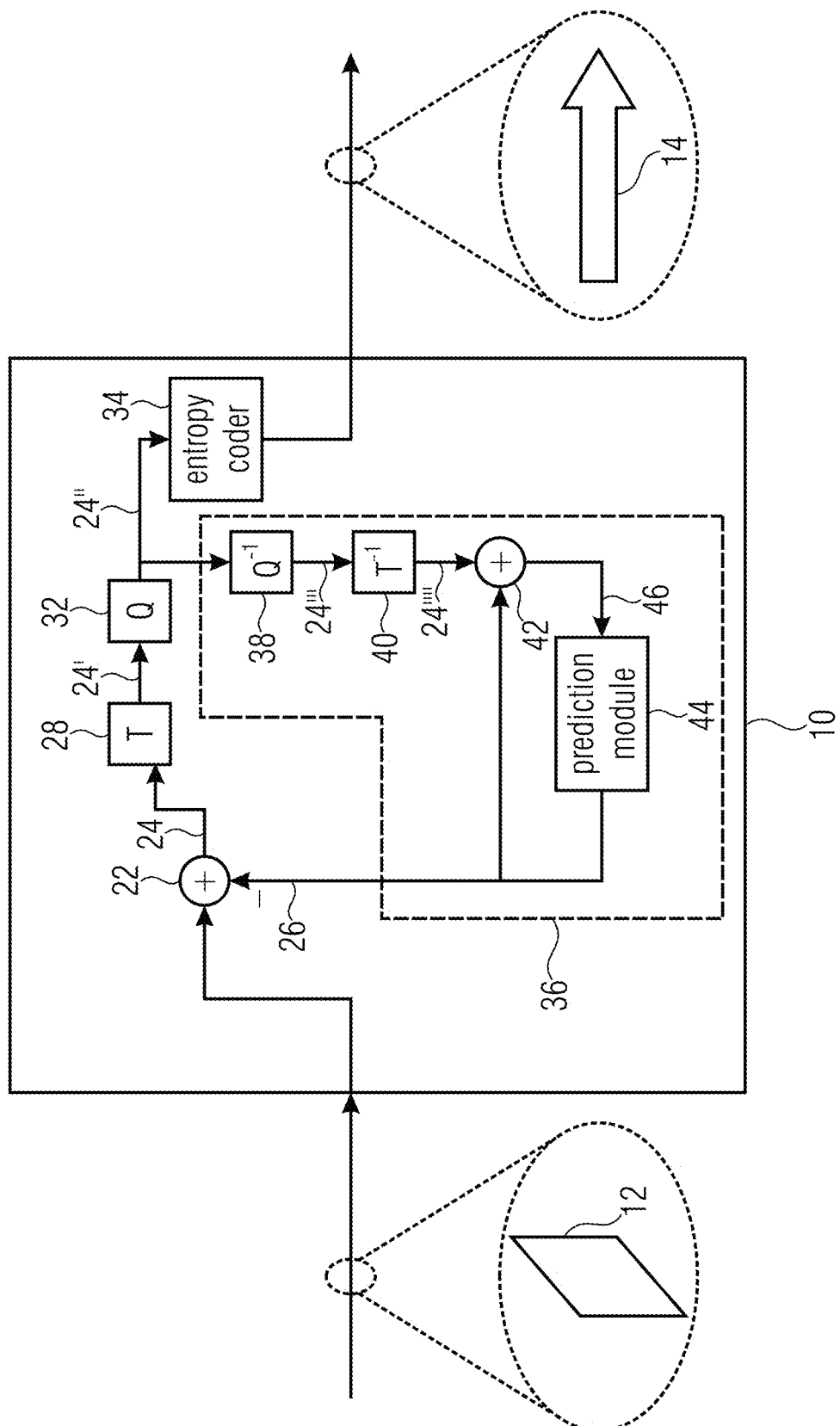
FIG. 1a shows a schematic view of an encoder.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1a to 3. The herein described embodiments of the concept of the present invention could be built into the encoder and decoder of FIGS. 1a, 1b and 2, respectively, although the embodiments described with FIGS. 4 to 6, may also be used to form encoders and decoders not operating according to the coding framework underlying the encoder and decoder of FIGS. 1a, 1b and 2.

Figure 1B:
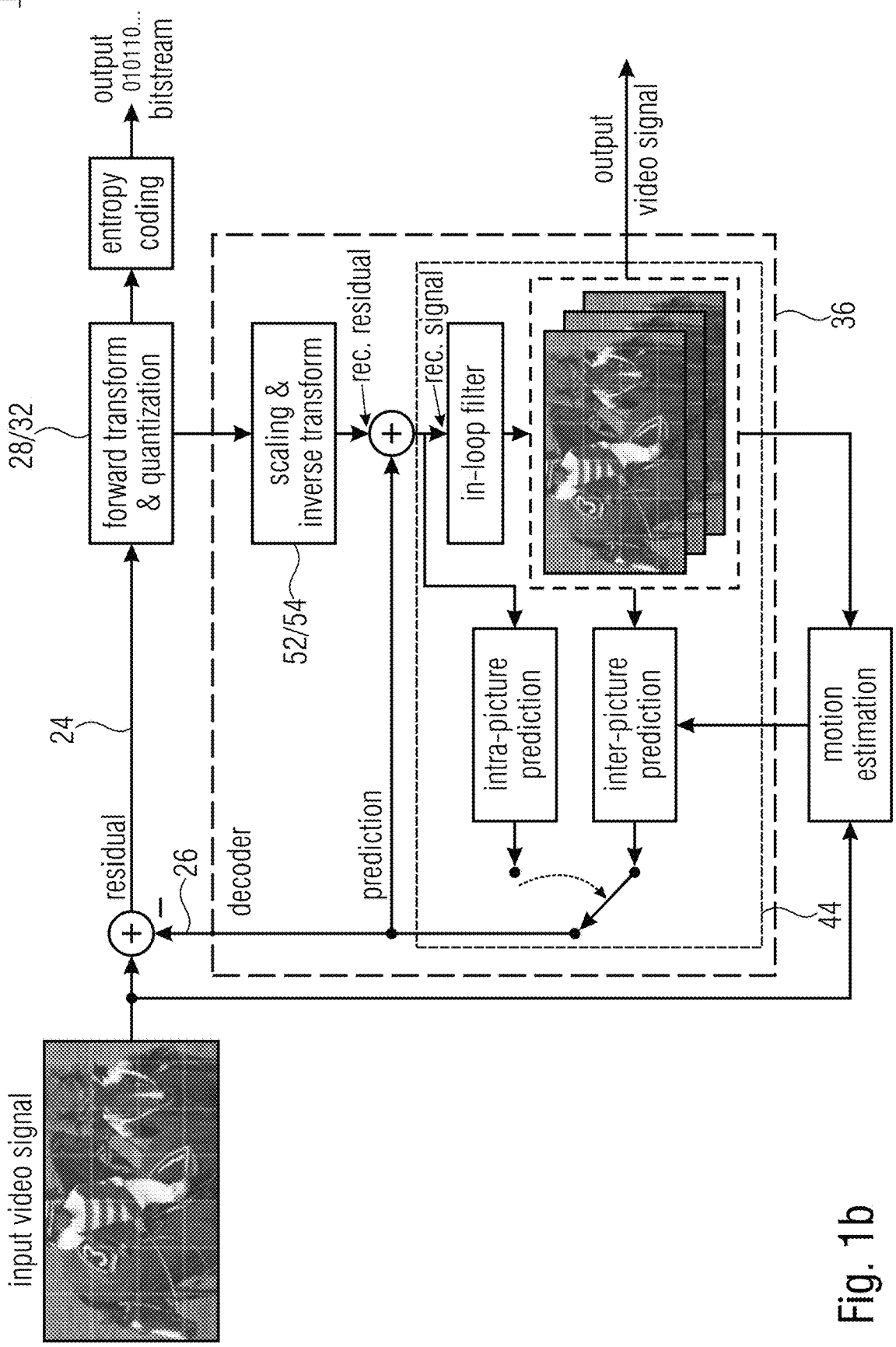
FIG. 1b shows a schematic view of an alternative encoder.
Figure 2:
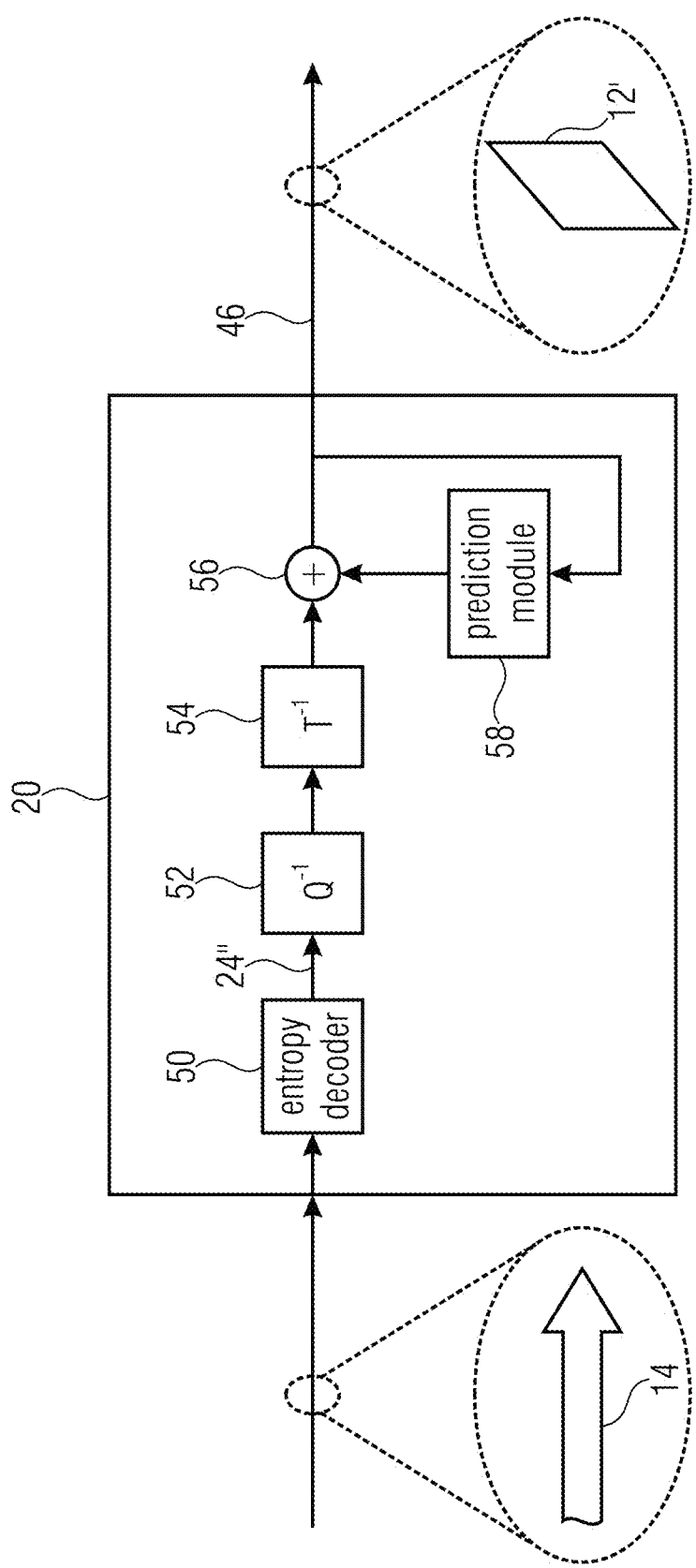
FIG. 2 shows a schematic view of a decoder.

FIG. 1a shows an apparatus (e. g. a video encoder and/or a picture encoder) for predictively coding a picture 12 into a data stream 14 exemplarily using transform-based residual coding. The apparatus, or encoder, is indicated using reference sign 10. FIG. 1b shows also the apparatus for predictively coding a picture 12 into a data stream 14, wherein a possible prediction module 44 is shown in more detail. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1a, 1b and FIG. 2 exemplarily use transform based prediction residual coding, although embodiments of the present application are not restricted to this kind of prediction residual coding. This is true for other details described with respect to FIGS. 1a, 1b and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal, thus obtained, to spectral-to-spatial transformation.

Internally, the encoder 10 may comprise a prediction residual signal former 22 which generates a prediction residual 24 so as to measure a deviation of a prediction signal 26 from the original signal, i.e. from the picture 12, wherein the prediction signal 26 can be interpreted as a linear combination of a set of one or more predictor blocks according to an embodiment of the present invention. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14.

The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1a, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction, as shown in FIG. 1b in more detail.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded.

Intra-coded blocks are predicted on the basis of a spatial, already coded/decoded neighborhood (e. g. a current template) of the respective block (e. g. a current block) as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples.

Compared thereto, inter-coded blocks may be predicted, for instance, temporally. For inter-coded blocks, motion vectors may be signaled within the data stream 14, the motion vectors indicating the spatial displacement of the portion of a previously coded picture (e. g. a reference picture) of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
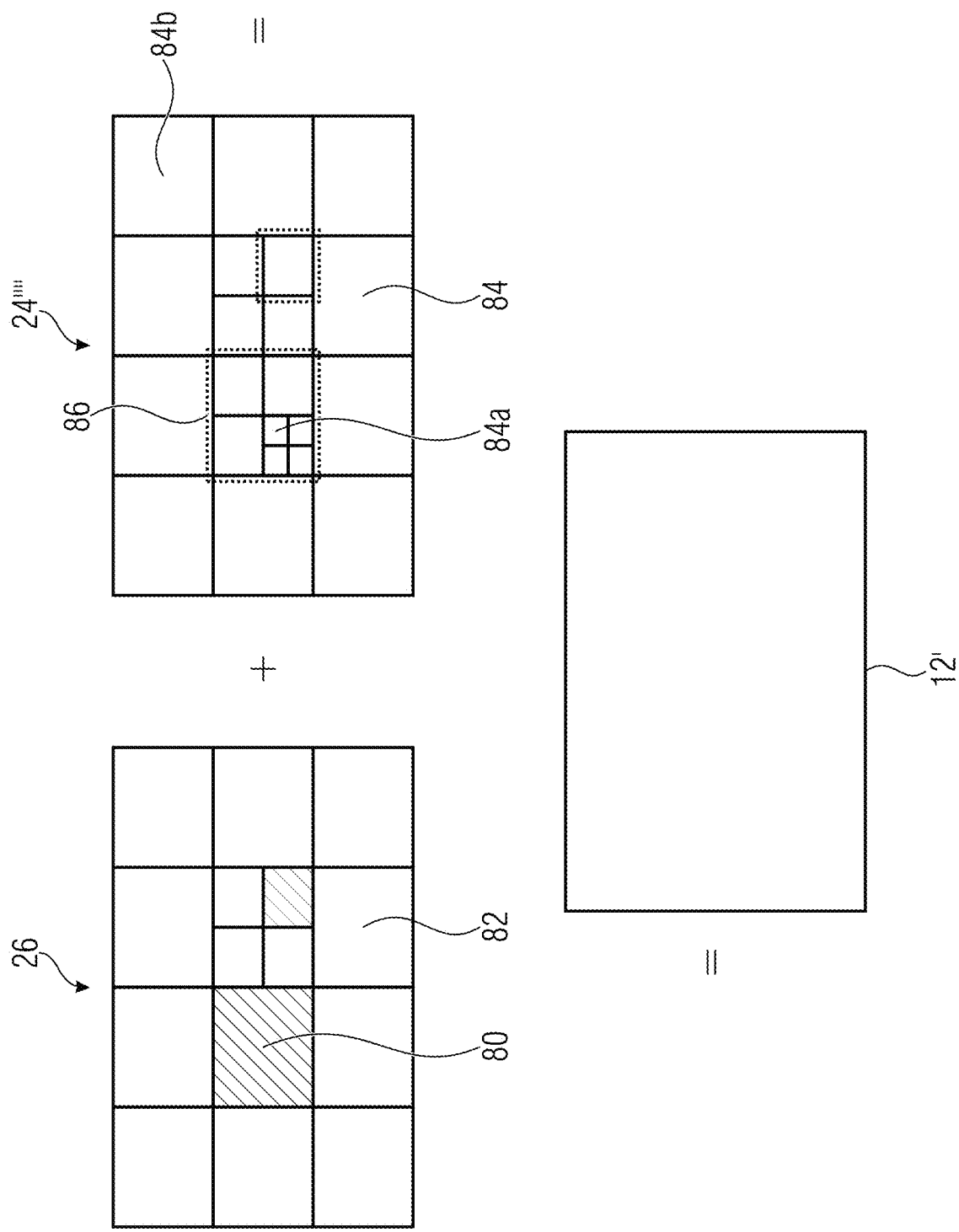
FIG. 3 shows a schematic view of a block-based coding.

FIG. 3 illustrates the relationship between the reconstructed signal, i.e. the reconstructed picture 12', on the one hand, and the combination of the prediction residual signal 24'''' as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST (discrete sine transform) or DCT (discrete cosine transform) for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform, but it is also possible, that no transform is used by the encoder or decoder at all or for single blocks 80, 82, 84.

As already outlined above, FIGS. 1a to 3 have been presented as an example where the inventive concept described herein may be implemented in order to form specific examples for encoders and decoders according to the present application. Insofar, the encoder and decoder of FIGS. 1a, 1b and 2, respectively, may represent possible implementations of the encoders and decoders described herein before. FIGS. 1a, 1b and 2 are, however, only examples. An encoder according to embodiments of the present application may, however, perform block-based encoding of a picture 12 using the concept outlined in more detail before or hereinafter and being different from the encoder of FIG. 1a or 1b such as, for instance, in that the sub-division into blocks 80 is performed in a manner different than exemplified in FIG. 3 and/or in that no transform (e.g. transform skip/identity transform) is used at all or for single blocks. Likewise, decoders according to embodiments of the present application may perform block-based decoding of picture 12' from data stream 14 using a coding concept further outlined below, but may differ, for instance, from the decoder 20 of FIG. 2 in that same sub-divides picture 12' into blocks in a manner different than described with respect to FIG. 3 and/or in that same does not derive the prediction residual from the data stream 14 in transform domain, but in spatial domain, for instance and/or in that same does not use any transform at all or for single blocks.

According to an embodiment the inventive concept described in the following can concern the transformer 28/inverse transformer 40 and the quantizer 32/dequantizer 38 of the encoder or the inverse transformer 54 and the dequantizer 52 of the decoder. According to an embodiment, the transformer 28, the inverse transformer 40, 54, the quantizer 32 and/or the dequantizer 38, 52 can be disabled for lossless coding of a block of a picture, wherein lossless coding is indicated by coding parameters, like a quantization parameter and a transform mode. The inventive concept may also concern further processing of the prediction residual 24″ and/or the prediction signal 26 and/or the prediction residual corrected predictive reconstruction 46, wherein the focus is on the function of the decoder/encoder at lossless coding.

The quantization step size, i.e. the quantization accuracy, can be varied depending on the selected transform and transform block size as described below. The description is written from the decoder perspective and the decoder-side scaling 52 (multiplication) with the quantization step size can be seen as being the inverse (non-reversible) of the encoder-side division by the step size.

Figure 4:
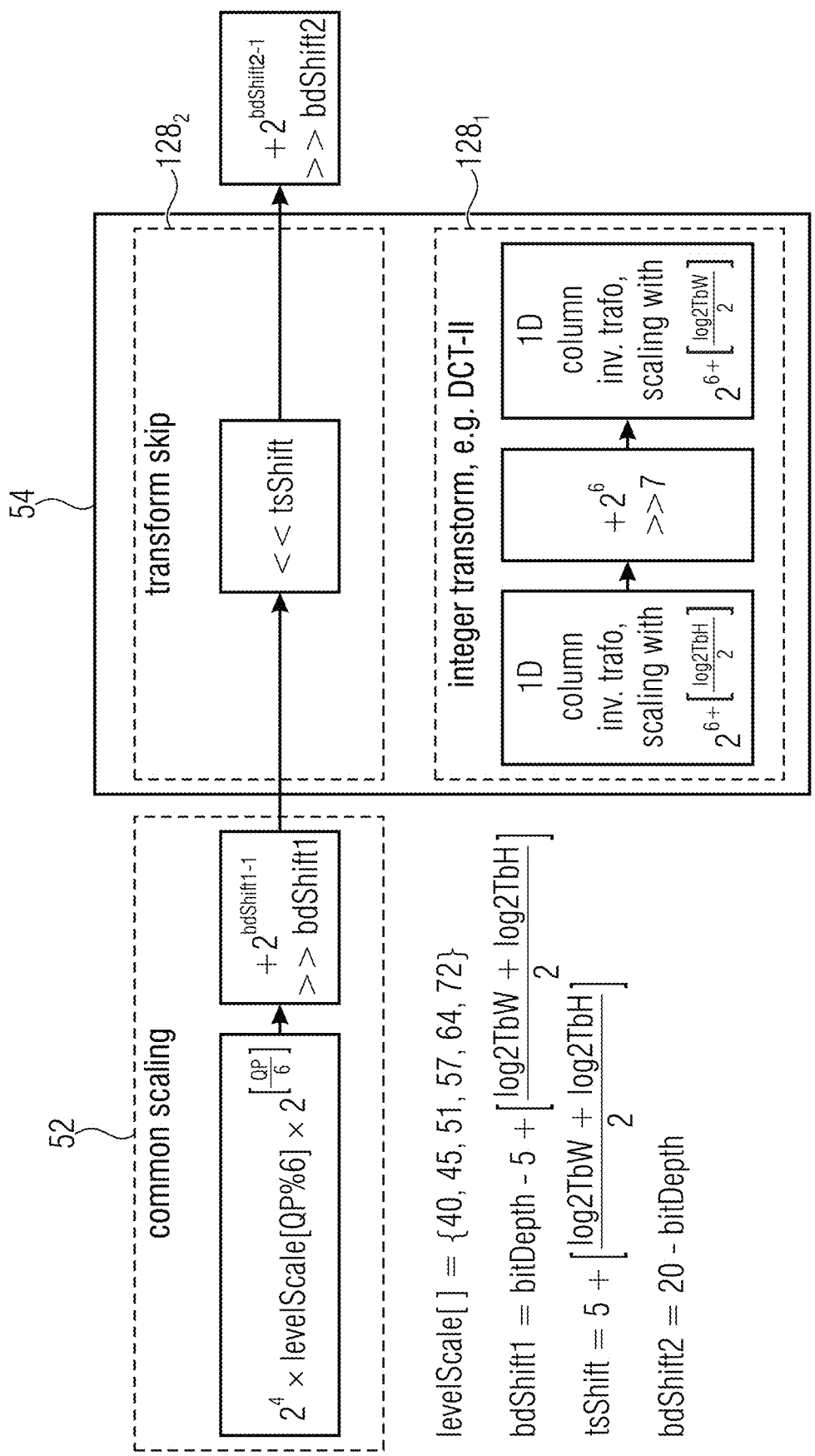
FIG. 4 shows a schematic view of a decoder-side scaling and inverse transform in recent video coding standards.

On the decoder side, the scaling 52, i.e. the dequantization, of (quantized) transform coefficient levels in current video coding standards like H.265/HEVC is designed for transform coefficients resulting from DCT/DST integer transforms with higher precision as illustrated in FIG. 4. In there, the variable bitDepth specifies the bit depth of the image samples, e.g. 8 or 10-bit. The variables log 2TbW and log 2TbH specify the binary logarithm of the transform block width and height, respectively. FIG. 4 shows a decoder-side scaling 52 and inverse transform 54 in recent video coding standards such as H.265/HEVC.

It should be noted that, at the decoder, the two 1D DCT/DST-based integer transforms $128_1$ introduce an additional factor of $2^{12} \cdot \sqrt{2^{log2TbW+log2TbH}}$, which needs to be compensated by scaling with the inverse. For non-square blocks with an odd log 2TbH+log 2TbW, the scaling includes a factor of √. This can be taken into account by either adding a scale factor of 181/256 or using a different set of levelScale values that incorporate that factor for this case, e.g. levelScale[ ]={29,32,36,40,45,51}. For the identity transform or transform skip case $128_2$, this does not apply.

It can be seen that the step size or scaling factor $$\left( \frac{2^4 \cdot levelScale[QP \%6] \cdot 2^{\lfloor \frac{QP}{6} \rfloor}}{2^{10}} \right)$$

becomes smaller then 1 for QPs less than 4 because levelScale for these QPs is less than $64=2^6$. For the transform coefficients, this is not a problem since the integer forward transform $128_1$ increases the precision of the residual signal and consequently the dynamic range. However, for the residual signal in case of the identity transform or transform skip $128_2$, there is no increase in dynamic range. In this case, the scaling factor less than 1 could introduce a distortion for the QPs<4 which is not there for QP 4, which has a scaling factor of 1. This is contradictory to the quantizer design intent where decreasing the QP should decrease the distortion.

Varying the quantization step size depending on the selected transform, e.g. whether the transform is skipped or not, could be used to derive a different quantization step size for transform skip $128_2$. Especially for the lowest QPs 0, 1, 2 and 3, this would solve the problem of having a quantization step size/scaling factor less than 1 for the lowest QPs.

Figure 5:
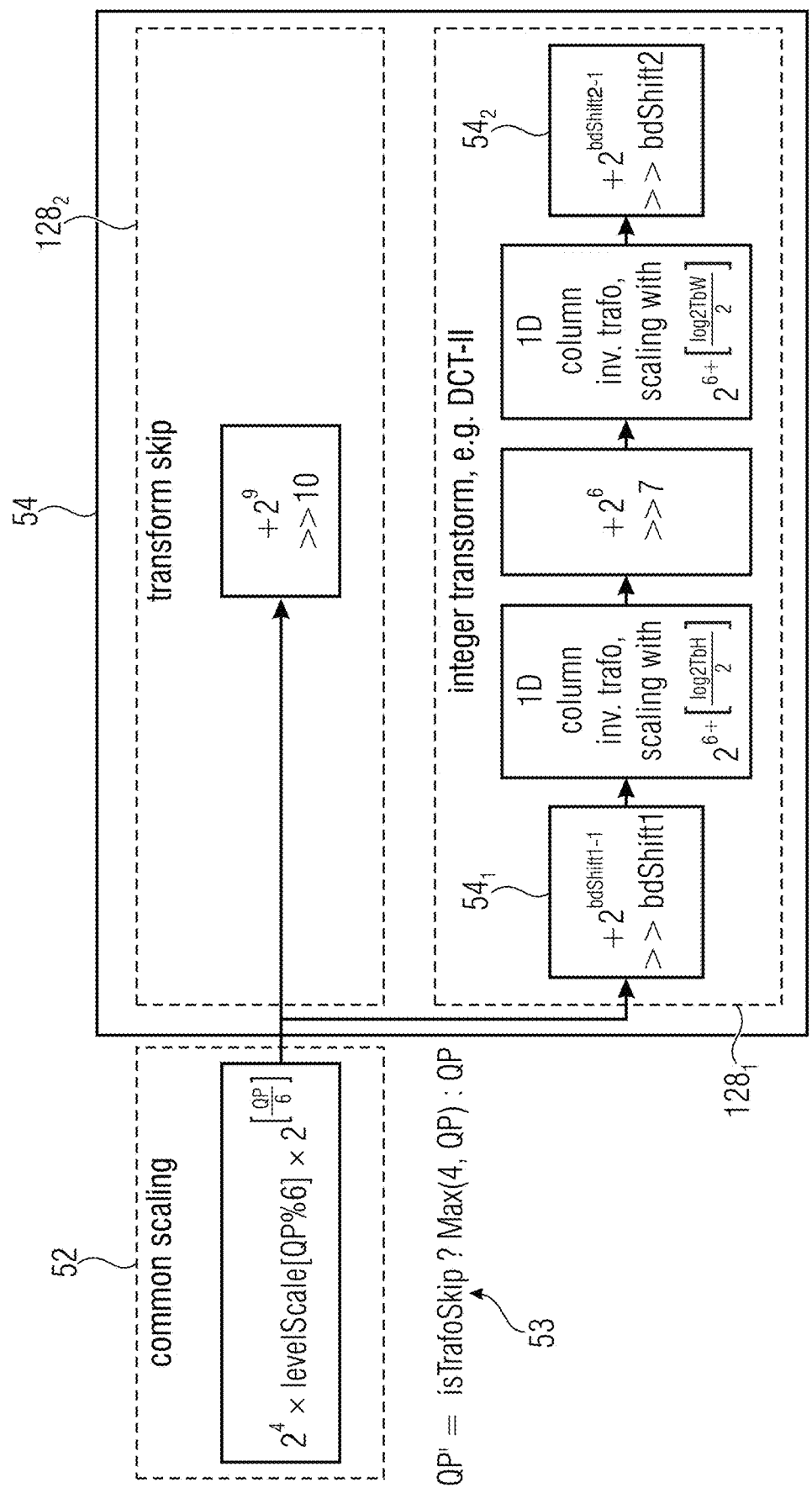
FIG. 5 shows a schematic view of a decoder-side scaling and inverse transform according to an example.

In one example shown in FIG. 5, the solution could be to clip 53 the quantization parameter to the minimum allowed value of four (QP), resulting in a quantization step size that cannot be lower than one. In addition to that, the size-dependent normalization $54_1$ with bdShift1 and the final rounding $54_2$ to the bit depth with bdShift2, used by the transform, can be moved to the transform path 54. This would reduce the transform skip scaling to a downshift by 10-bit with rounding. In another example, a bitstream restriction can be defined that does not allow an encoder to use QP values that result in a scaling factor of less than 1 for transform skip instead of clipping the QP value to 4. FIG. 5 shows an improved decoder-side scaling 52 and inverse transform 54 according the present invention.

At the other end of the bit-rate range, i.e. for lower bit rates, the quantization step size for the identity transform $128_2$ may be decreased by an offset, resulting in a higher fidelity for block that does not apply a transform or that does apply the identity transform $128_2$. This would enable the encoder to select appropriate QP values for transform skip blocks to achieve higher compression efficiency. This aspect is not limited to the identity transform/transform skip $128_2$, it can also be used to modify the QP for other transform types $128_1$ by an offset. An encoder would, e.g., determine this offset in a way that increases the coding efficiency, e.g. by maximizing perceived visual quality or minimizing objective distortion like a square error for a given bitrate, or by reducing the bitrate for a given quality/distortion. This (in terms of the applied criterion) optimal derivation from the slice QP depends, for example, on the content, bit-rate or complexity operation point, and further factors such as selected transform and transform block size. The present invention describes methods for signaling the QP offset for the case of multiple transforms. Without loss of generality, given two alternative transforms, a fixed QP offset may be transmitted by the encoder in a high-level syntax structure (such as sequence parameter set, picture parameter set, tile group header, slice header, or similar) for each of the two alternative transforms. Alternatively, the QP offset is, e.g., transmitted by the encoder for each transform block when the encoder has selected the alternative transform. A combination of the two approaches is the signaling of a basis QP offset in a high-level syntax structure and an additional offset for each transform block that uses the alternative transform. The offset can be a value that is added or subtracted to a basis QP or an index into a set of offset values. That set can be predefined or signaled in a high-level syntax structure.

- the QP offset relative to a basis QP for the identity transform may be signaled in a high-level syntax structure, e.g on sequence, picture, tile group, tile, or slice level.
- alternatively, the QP offset relative to a basis QP for the identity transform may be signaled for each coding unit or predefined set of coding units.
- alternatively, the QP offset relative to a basis QP, for the identity transform is signaled for each transform unit that applies the identity transform.

Figure 6:
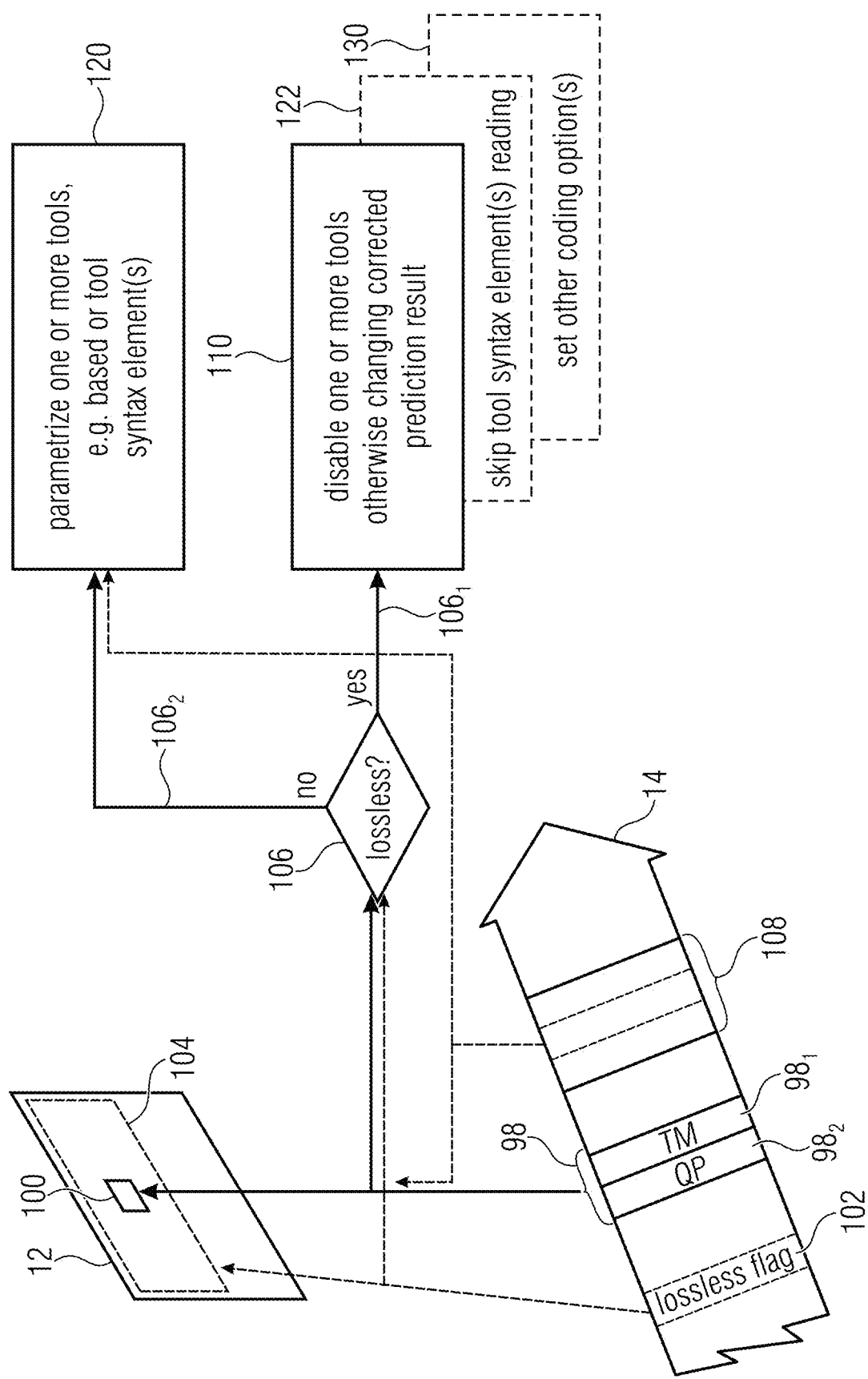
FIG. 6 shows a schematic view of a lossless coding check performed by a decoder and/or encoder according to an embodiment.

FIG. 6 shows features and functionalities of a decoder, for example, of a decoder 20 or 36 shown in FIGS. 1a to 2. Also the following description is mainly written from the decoder perspective it is clear that an encoder may comprise parallel features.

A picture 12 is encoded into a data stream 14 by the encoder and the decoder is configured to provide a reconstructed picture based on the data stream 14, wherein the reconstructed picture equals the picture 12 or has no recognizable minimal differences to the picture 12 in case of lossless coding. The picture 12 can be divided into portions 100, i.e. blocks, and regions 104. A region 104 comprises a plurality of portions 100. A predetermined portion 100 is within a predetermined region 104. The data stream 14 may comprise portion individual information, like a plurality 98 of coding parameters, and region individual information, like optionally a lossless coding syntax element 102. The plurality 98 of coding parameters relate to a predetermined portion 100 of the picture 12 and control a prediction residual transform mode, e.g. within the transformer 28 and the inverse transformer 40, 54 shown in FIGS. 1*a* to 2, and a quantization accuracy, e.g. within the quantizer 28 and the dequantizer 40, 54 shown in FIGS. 1*a* to 2, with respect to the predetermined portion 100. The prediction residual transform mode may be controlled by a transform mode indicating syntax element $98_1$. The quantization accuracy may be controlled by a quantization parameter (QP) $98_2$.

A decoder for decoding the picture 12 from the data stream 14 is configured to check 106 whether a plurality 98 of coding parameters, is indicative of a coding parameter setting corresponding, either because immediately signaling such a coding, or by leading to such a coding by the decoder being configured to interpret or change such a setting to a setting leading to lossless residual coding, such as mapping QP<4 to QP=4 in case of TM=transform skip, to a lossless prediction residual coding $106_1$. An encoder for encoding the picture 12 into the data stream 14 may also be configured to check whether the plurality 98 of coding parameters, is indicative of a coding parameter setting corresponding to the lossless prediction residual coding $106_1$. (QP,TM)=(4,transform skip) or (QP, TM)=(1 . . . 4, transform skip) may represent a coding parameter setting corresponding to lossless prediction residual coding $106_1$. A coding parameter setting of a quantization parameter $98_2$ to a quantization accuracy equal or finer than a predetermined quantization accuracy and/or a transform mode indicating syntax element $98_1$ to a transform skip as transform mode may correspond to the lossless prediction residual coding $106_1$.

According to an embodiment, the decoder/encoder is configured to read/signal the plurality 98 of coding parameters from/into the data stream 14 and check whether the prediction residual transform mode indicated by the plurality 98 of coding parameters, e.g. indicated by the transform mode indicating syntax element $98_1$, corresponds to a transform skip mode and whether a quantization accuracy indicated by the plurality 98 of coding parameters, e.g. indicated by the quantization parameter $98_2$, corresponds to a quantization step size finer than a predetermined quantization step size, e.g., corresponds to QP<4, corresponding to no quantization and, if yes, change the quantization step size to the predetermined quantization step size, e.g. QP=4. If the transform mode is set to transform skip, the decoder/encoder is configured to map a quantization parameter $98_2$ finer than the predetermined quantization accuracy (QP<4) to a quantization parameter $98_2$ equal the predetermined quantization accuracy to enable a lossless coding. The predetermined quantization accuracy might represent no quantization 32, 52 or a bypassing or disabling of a quantization 32, 52.

Responsive to the plurality 98 of coding parameters being indicative of the coding parameter setting corresponding to the lossless prediction residual coding $106_1$, the decoder/encoder is configured to set 110 one or more predetermined coding options relating to one or more tools of the decoder/encoder for processing a prediction residual corrected predictive reconstruction (e.g. in the prediction-loop of the encoder) with respect to the predetermined portion 100 so that the one or more tools are disabled with respect to the predetermined portion 100. The prediction residual corrected predictive reconstruction may represent the output, i.e. the reconstructed signal 46, of the combiner 56 or 42, respectively, as shown in FIGS. 1*a* to 2. The one or more tools, e.g., relate to deblocking, SAO, ALF and may be positioned downstream the output 46 of the combiner 56 or 42, respectively.

According to an embodiment the decoder/encoder is configured to set the one or more predetermined coding options with respect to the predetermined portion 100 so that the one or more tools are disabled 110 with respect to the predetermined portion 100 if the plurality of coding parameters are indicative of the coding parameter setting corresponding to the lossless prediction residual coding $106_1$ and to a predetermined tool state if the plurality of coding parameters are not indicative of the coding parameter setting corresponding to the lossless prediction residual coding, i.e. in a lossy coding case $106_2$.

The decoder is optionally configured to read from the data stream 14 a lossless coding syntax element 102 (e.g., determined and encoded by the encoder) which indicates whether a predetermined region 104 of the picture, which covers or contains the predetermined portion 100, is coded into the data stream 14 using, not exclusively, but for portions fulfilling the check 106, lossless coding or lossy coding. The decoder is configured to set 110 the one or more predetermined coding options so that the one or more tools are disabled with respect to the predetermined portion 100 if the lossless coding syntax element 102 indicates that the predetermined region 104 of the picture 12 is coded into the data stream 14 using lossless coding $106_1$, and if the plurality 98 of coding parameters are indicative of the coding parameter setting corresponding to the lossless prediction residual coding $106_1$. Additionally, the decoder is configured to set 120 the one or more predetermined coding options to a predetermined tool state if the plurality 98 of coding parameters do not indicate, i.e. are not equal to, the coding parameter setting corresponding to the lossless prediction residual coding $106_1$ or the lossless coding syntax element 102 indicates that the predetermined region 104 of the picture 12 is coded into the data stream 14 using lossy coding $106_2$. The lossless coding syntax element 102 is signaled for a region 104 of the picture 12 and for each portion 100 within the region 104 the decoder/encoder checks 106 whether the plurality 98 of coding parameters indicate for the individual portion 100 a lossless coding $106_1$ or a lossy coding $106_2$. Thus it is possible that some of the portions are decoded/encoded differently than indicated by the lossless coding syntax element 102 for the whole region 104.

According to an embodiment, the decoder is configured to determine the predetermined tool state depending on one or more syntax elements 108, e.g. syntax elements relating to SAO, ALF or the like, in the data stream 14. In case of lossless coding $106_1$ the decoder is configured to skip 122 reading the one or more tool syntax elements 108, since the one or more tools are disabled 110. Optionally, at least one of the one or more syntax elements 108 is absent from the data stream 14 if the one or more predetermined coding options with respect to the predetermined portion 100 are set so that the one or more tools are disabled 110 with respect to the predetermined portion 100, compare aspect 3.4.

According to an embodiment, the decoder is configured to set 130 one or more further coding options with respect to the predetermined portion 100, e.g., described with respect to the following aspects 1 to 3.4 in the description below, to a default state responsive to the plurality 98 of coding parameters being indicative of the coding parameter setting corresponding to the lossless prediction residual coding $106_1$. The default state may represent a reduction of a filtering or a disabling of a filtering, cf. aspect 3.3, in terms of low-pass filtering for a derivation of a prediction signal, e.g. the prediction signal 26 shown in FIGS. 1a to 2, for the predetermined portion 100 and/or a perfectly invertible transform, cf. aspect 3.2, to be performed on a prediction residual signal, e.g. the prediction residual signal 24 shown in FIGS. 1a to 2. The further coding options may relate to a binarization, cf. aspect 3.1, of prediction residual data into bin strings and context-adaptive binary entropy decoding of the bin strings and/or a usage of a perfectly invertible transform, cf. aspect 3.2, on a prediction residual 24''', 24'''' or a prediction residual corrected reconstruction 46 of the predetermined portion 100 and/or a disabling or reduction of a filtering, cf. aspect 3.3, for a derivation of the prediction signal 26 for the predetermined portion and/or a disabling of a processing of a prediction residual corrected predictive reconstruction 46 with respect to the predetermined portion 100 or a prediction residual re-quantization, cf. aspect 3.4. Similarly, for an encoder the further coding options may relate to a binarization of prediction residual data into bin strings and context-adaptive binary entropy encoding of the bin strings and/or a usage of a perfectly invertible transform on a prediction residual 24''', 24'''' or a prediction residual corrected reconstruction 46 of the predetermined portion in a prediction-loop of the encoder and/or a disabling or reduction of a filtering for a derivation of a prediction signal 26 for the predetermined portion and/or a disabling of a processing of a prediction residual corrected predictive reconstruction 46 with respect to the predetermined portion 100 or a prediction residual quantization.

An encoder can be configured to determine and encode the plurality 98 of coding parameters, lossless coding syntax element 102 and/or the tool syntax elements 108 in the data stream 14. The encoder can comprise parallel features and/or functionalities as described with regard to the decoder. This applies at least for the prediction-loop 36 of the encoder which has the same features and/or functionalities as the decoder. But it is clear, that features relating to the inverse transformer 54 or the dequantizer 52 of the decoder can similarly also be applied to the transformer 28 and/or the quantizer 32 of the encoder.

One or more of the following aspects may be integrated in the decoder/encoder described with regard to FIG. 6. Alternatively, the following aspects can be implemented individually in a decoder or encoder.

Aspect 1: Reduction of a Number of Syntax Elements for Lossless Image or Video Coding The basic approach of this aspect is to make a subblock-wise transform quantization bypass coding flag obsolete since, with the corrections described above, its functionality is completely provided by the subblock-wise transform skipping functionality when a coding quantization parameter (QP) of 4 (unity step-size) is employed and post reconstruction modifications of block samples by coding tools such as in-loop filters are disabled. The deactivation of such post filters can be achieved by the conditioning on the transform skip mode and a QP that is lower or equal than four.

In the following paragraphs, different possible implementations are specified.

An embodiment of aspect 1 is by means of a coding block-wise (here, transform block-wise and color component-wise) one-bit transform skipping indicator, called transform_skip_flag. This indicator is transmitted as part of the transform unit coding syntax, for example, as shown in table 1. The plurality 98 of coding parameters may comprise the transform_skip_flag, i.e. the transform mode indicating syntax element $98_1$, controlling the prediction residual transform mode with respect to the predetermined portion 100 of the picture 12. The transform_skip_flag defines a transform skip as the transform mode, i.e. the prediction residual transform mode, for the predetermined portion 100.

TABLE 1 transform unit coding syntax

| | Descriptor |
|---|---|
| transform_unit( x0, y0, tbWidth, tbHeight, treeType, subTuIndex, chType ) { | |
|   if( IntraSubPartitionsSplitType != ISP_NO_SPLIT && | |
|      treeType = = SINGLE_TREE && subTuIndex = = NumIntraSubPartitions − 1 ) { | |
|     xC = CbPosX[ chType ][ x0 ][ y0 ] | |
|     yC = CbPosY[ chType ][ x0 ][ y0 ] | |
|     wC = CbWidth[ chType ][ x0 ][ y0 ] / SubWidthC | |
|     hC = CbHeight[ chType ][ x0 ][ y0 ] / SubHeightC | |
|   } else { | |
|     xC = x0 | |
|     yC = y0 | |
|     wC = tbWidth / SubWidthC | |
|     hC = tbHeight / SubHeightC | |
|   } | |
|   chromaAvailable = treeType != DUAL_TREE_LUMA && sps_chroma_format_idc != 0 && | |
|     ( IntraSubPartitionsSplitType = = ISP_NO_SPLIT \|\| | |
|     ( IntraSubPartitionsSplitType != ISP_NO_SPLIT && | |
|     subTuIndex = = NumIntraSubPartitions − 1 ) ) | |
|   if( ( treeType = = SINGLE_TREE \|\| treeType = = DUAL_TREE_CHROMA ) && | |
|      sps_chroma_format_idc != 0 && | |
|       ( ( IntraSubPartitionsSplitType = = ISP_NO_SPLIT && !( cu_sbt_flag && | |
|       ( ( subTuIndex = = 0 && cu_sbt_pos_flag ) \|\| | |
|       ( subTuIndex = = 1 && !cu_sbt_pos_flag ) ) ) \|\| | |
|       ( IntraSubPartitionsSplitType != ISP_NO_SPLIT && | |
|       ( subTuIndex = = NumIntraSubPartitions − 1 ) ) ) ) { | |
|     tu_cb_coded_flag[ xC ][ yC ] | ae(v) |
|     tu_cr_coded_flag[ xC ][ yC ] | ae(v) |
|   } | |

TABLE 1-continued transform unit coding syntax

| | Descriptor |
|---|---|
| ```
if( treeType = = SINGLE_TREE || treeType = = DUAL_TREE_LUMA) {
    if( ( IntraSubPartitionsSplitType = = ISP_NO_SPLIT && !( cu_sbt_flag &&
        ( ( subTuIndex = = 0 && cu_sbt_pos_flag ) ||
        ( subTuIndex = = 1 && !cu_sbt_pos_flag ) ) ) &&
        ( CuPredMode[ chType ][ x0 ][ y0 ] = = MODE_INTRA ||
        ( chromaAvailable && ( tu_cb_coded_flag[ xC ][ yC ] ||
        tu_cr_coded_flag[ xC][ yC ] ) ) ||
        CbWidth[ chType ][ x0][ y0 ] > MaxTbSizeY ||
        CbHeight[ chType ][ x0][ y0 ] > MaxTbSizeY ) ) ||
        ( IntraSubPartitionsSplitType != ISP_NO_SPLIT &&
        ( subTuIndex < NumIntraSubPartitions − 1 || !InferTuCbfLuma ) ) )
        tu_y_coded_flag [ x0 ][ y0 ]
    if( IntraSubPartitionsSplitType != ISP_NO_SPLIT )
        InferTuCbfLuma = InferTuCbfLuma && !tu_y_coded_flag[ x0 ][ y0 ]
}
if( CbWidth[ chType ][ x0 ][ y0 ] > 64 || CbHeight[ chType ][ x0 ][ y0 ] > 64 ||
    tu_y_coded_flag[ x0 ][ y0 ] || ( chromaAvailable && ( tu_cb_coded_flag[ xC ][ yC ] ||
    tu_cr_coded_flag[ xC ][ yC ] ) ) && treeType != DUAL_TREE_CHROMA &&
    pps_cu_qp_delta_enabled_flag && !IsCuQpDeltaCoded ) {
    cu_qp_delta_abs
    if( cu_qp_delta_abs )
        cu_qp_delta_sign_flag
}
if( ( Cb Width[ chType][ x0][ y0 ] > 64 || CbHeight[ chType][ x0][ y0 ] >64 ||
    ( chromaAvailable && ( tu_cb_coded_flag[ xC ][ yC ] ||
    tu_cr_coded_flag[ xC ][ yC ] ) ) ) &&
    treeType != DUAL_TREE_LUMA && sh_cu_chroma_qp_offset_enabled_flag &&
    !IsCuChromaQpOffsetCoded ) {
    cu_chroma_qp_offset_flag
    if( cu_chroma_qp_offset_flag && pps_chroma_qp_offset_list_len_minus1 > 0 )
        cu_chroma_qp_offset_idx
}
if( sps_joint_cbcr_enabled_flag && ( ( CuPredMode[ chType ][ x0 ][ y0 ] = = MODE_INTRA
    && ( tu_cb_coded_flag[ xC ][ yC ] || tu_cr_coded_flag[ xC ][ yC ] ) ) ||
    ( tu_cb_coded_flag[ xC ][ yC ] && tu_cr_coded_flag[ xC ][ yC ] ) ) &&
    chromaAvailable )
    tu_joint_cbcr_residual_flag[ xC ][ yC ]
if( tu_y_coded_flag[ x0 ][ y0 ] && treeType != DUAL_TREE_CHROMA ) {
    if( sps_transform_skip_enabled_flag && !BdpcmFlag[ x0 ][ y0 ][ 0 ] &&
        tbWidth >= MaxTsSize && tbHeight >= MaxTsSize &&
        ( IntraSubPartitionsSplitType = = ISP_NO_SPLIT ) && !cu_sbt_flag )
        transform_skip_flag[ x0 ][ y0 ][ 0 ]
    if( !transform_skip_flag[ x0 ][ y0 ][ 0 ] || sh_ts_residual_coding_disabled_flag )
        residual_coding( x0, y0, Log2( tbWidth ), Log2( tbHeight ), 0 )
    else
        residual_ts_coding( x0, y0, Log2( tbWidth ), Log2( tbHeight ), 0 )
}
if( tu_cb_coded_flag[ xC ][ yC ] && treeType != DUAL_TREE_LUMA ) {
    if( sps_transform_skip_enabled_flag && !BdpcmFlag[ x0 ][ y0 ][ 1 ] &&
        wC >= MaxTsSize && hC >= MaxTsSize && !cu_sbt_flag )
        transform_skip_flag[ xC ][ yC ][ 1 ]
    if( !transform_skip_flag[ xC ][ yC ][ 1 ] || sh_ts_residual_coding_disabled_flag )
        residual_coding( xC, yC, Log2( wC ), Log2( hC ), 1 )
    else
        residual_ts_coding( xC, yC, Log2( wC ), Log2( hC ), 1 )
}
if( tu_cr_coded_flag[ xC ][ yC ] && treeType != DUAL_TREE_LUMA &&
    !( tu_cb_coded_flag[ xC ][ yC ] && tu_joint_cbcr_residual_flag[ xC ][ yC ] ) ) {
    if( sps_transform_skip_enabled_flag && !BdpcmFlag[ x0 ][ y0 ][ 2 ] &&
        wC >= MaxTsSize && hC >= MaxTsSize && !cu_sbt_flag )
        transform_skip_flag[ xC ][ yC ][ 2 ]
    if( !transform_skip_flag[ xC ][ yC ][ 2 ] || sh_ts_residual_coding_disabled_flag )
        residual_coding( xC, yC, Log2( wC ), Log2( hC ), 2 )
    else
        residual_ts_coding( xC, yC, Log2( wC ), Log2( hC ), 2 )
}
}
``` | ae(v)<br><br><br><br><br><br><br><br><br><br><br><br>ae(v)<br>ae(v)<br><br><br><br><br><br>ae(v)<br><br>ae(v)<br><br><br><br><br>ae(v)<br><br><br>ae(v)<br><br><br><br><br>ae(v)<br><br><br><br><br>ae(v) |

Depending on this transform_skip_flag (value 1 if transform skipping is used, value 0 otherwise), an actual quantization parameter qP $98_2$ may be determined, for example, as specified in equations (436)-(438), for palette coding as described under item 1.1, as well as equation (1153), for transform coefficients scaling as described under item 1.2, otherwise. The plurality 98 of coding parameters may comprise this quantization parameter qP $98_2$ controlling the quantization accuracy with respect to the predetermined portion 100 of the picture 12.

1.1 Decoding Process for Palette Mode

Inputs to this process are:
- a location (xCbComp, yCbComp) specifying the top-left sample of the current coding block relative to the top-left sample of the current picture,
- a variable treeType specifying whether a single or a dual tree is used and if a dual tree is used, it specifies whether the current tree corresponds to the luma or chroma components,
- a variable cIdx specifying the colour component of the current block,
- two variables nCbW and nCbH specifying the width and height of the current coding block, respectively.

Output of this process is an array recSamples[x][y], with x=0 . . . nCbW−1, y=0 . . . nCbH−1 specifying reconstructed sample values for the block.

Depending on the value of treeType, the variables startComp, numComps and maxNumPalettePredictorSize are derived as follows:

If treeType is equal to SINGLE_TREE:

$$\text{startComp}=0 \quad (422)$$

$$\text{numComps}=sps\_chroma\_format\_idc==0?1:3 \quad (423)$$

$$\text{maxNumPalettePredictorSize}=63 \quad (424)$$

Otherwise, treeType is equal to DUAL_TREE_LUMA:

$$\text{startComp}=0 \quad (425)$$

$$\text{numComps}=1 \quad (426)$$

$$\text{maxNumPalettePredictorSize}=31 \quad (427)$$

Otherwise, treeType is equal to DUAL_TREE_CHROMA:

$$\text{startComp}=1 \quad (428)$$

$$\text{numComps}=2 \quad (429)$$

$$\text{maxNumPalettePredictorSize}=31 \quad (430)$$

Depending on the value of cIdx, the variables nSubWidth and nSubHeight are derived as follows:

If cIdx is greater than 0 and startComp is equal to 0, nSubWidth is set equal to SubWidthC and nSubHeight is set equal to SubHeightC.

Otherwise, nSubWidth is set equal to 1 and nSubHeight is set equal to 1.

The (nCbW×nCbH) block of the reconstructed sample array recSamples at location (xCbComp, yCbComp) is represented by recSamples[x][y] with x=0 . . . nCbW−1 and y=0 . . . nCbH−1, and the value of recSamples[x][y] for each x in the range of 0 to nCbW−1, inclusive, and each y in the range of 0 to nCbH−1, inclusive, is derived as follows:

The variables xL, yL, xCbL, and yCbL are derived as follows:

$$xL=x*n\text{SubWidth} \quad (431)$$

$$yL=y*n\text{SubHeight} \quad (432)$$

$$xCbL=xCb\text{Comp}*n\text{SubWidth} \quad (433)$$

$$yCbL=yCb\text{Comp}*n\text{SubHeight} \quad (434)$$

The variable bIsEscapeSample is derived as follows:
If PaletteIndexMap[xCbL+xL][yCbL+yL] is equal to MaxPaletteIndex and palette_escape_val_present_flag is equal to 1, bIsEscapeSample is set equal to 1.
Otherwise, bIsEscapeSample is set equal to 0.

If bIsEscapeSample is equal to 0, the following applies:

$$\text{recSamples}[x][y]=\text{CurrentPaletteEntries}[c\text{Idx}][\text{PaletteIndexMap}[xCbL+xL]][yCbL+yL] \quad (435)$$

Otherwise (bIsEscapeSample is equal to 1), the following ordered steps apply:
1. The quantization parameter qP is derived as follows:
If cIdx is equal to 0, $$qP=\text{Max}(\text{QpPrimeTsMin},Qp'_Y) \quad (436)$$

Otherwise, if cIdx is equal to 1, $$qP=\text{Max}(\text{QpPrimeTsMin},Qp'_{Cb}) \quad (437)$$

Otherwise (cIdx is equal to 2), $$qP=\text{Max}(\text{QpPrimeTsMin},Qp'_{Cr}) \quad (438)$$

1.2 Scaling Process for Transform Coefficients

Inputs to this process are:
- a luma location (xTbY, yTbY) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.

Output of this process is the (nTbW)×(nTbH) array d of scaled transform coefficients with elements d[x][y].

The quantization parameter qP and the variable QpActOffset are derived as follows:

If cIdx is equal to 0, the following applies:

$$qP=Qp'_Y \quad (1142)$$

$$\text{QpActOffset}=cu\_act\_enabled\_flag[xTbY][yTbY]?-5:0 \quad (1143)$$

Otherwise, if TuCResMode[xTbY][yTbY] is equal to 2, the following applies:

$$qP=Qp'_{CbCr} \quad (1144)$$

$$\text{QpActOffset}=cu\_act\_enabled\_flag[xTbY][yTbY]?1:0 \quad (1145)$$

Otherwise, if cIdx is equal to 1, the following applies:

$$qP=Qp'_{Cb} \quad (1146)$$

$$\text{QpActOffset}=cu\_act\_enabled\_flag[xTbY][yTbY]?1:0 \quad (1147)$$

Otherwise (cIdx is equal to 2), the following applies:

$$qP=Qp'_{Cr} \quad (1148)$$

$$\text{QpActOffset}=cu\_act\_enabled\_flag[xTbY][yTbY]?3:0 \quad (1149)$$

The quantization parameter qP is modified and the variables rectNonTsFlag and bdShift are derived as follows:

If transform_skip_flag[xTbY][yTbY][cIdx] is equal to 0, the following applies:

$$qP = \text{Clip3}(0, 63+\text{Qp}Bd\text{Offset}, qP+\text{QpActOffset}) \quad (1150)$$

$$\text{rectNon}Ts\text{Flag} = (((\text{Log } 2(nTbW) + \text{Log } 2(nTbH)) \& 1) == 1)?1:0 \quad (1151)$$

$$bd\text{Shift} = \text{BitDepth} + \text{rectNon}Ts\text{Flag} + ((\text{Log } 2(nTbW) + \text{Log } 2(nTbH))/2) - 5 + sh\_\text{dep\_quant\_used\_flag} \quad (1152)$$

Otherwise (transform_skip_flag[xTbY][yTbY][cIdx] is equal to 1), the following applies:

$$qP = \text{Clip3}(\text{QpPrime}Ts\text{Min}, 63+\text{Qp}Bd\text{Offset}, qP+\text{QpActOffset}) \quad (1153)$$

$$\text{rectNon}Ts\text{Flag} = 0 \quad (1154)$$

$$bd\text{Shift} = 10 \quad (1155)$$

According to an embodiment, the value of qP is limited to be greater than or equal to a minimum of QpPrimeTsMin, a constant (across the given video sequence) specified in equation (69):

sps_internal_bitdepth_minus_input_bitdepth specifies the minimum allowed quantization parameter for transform skip mode as follows:

$$\text{QpPrime}Ts\text{Min} = 4 + 6 * sps\_\text{internal\_bitdepth\_minus\_input\_bitdepth} \quad (69)$$

The value of sps_internal_bitdepth_minus_input_bitdepth shall be in the range of 0 to 8, inclusive.

In other words, the decoder/encoder is configured to read/signal the plurality 98 of coding parameters from/into the data stream 14 and check whether the prediction residual transform mode indicated by the plurality of coding parameters corresponds to a transform skip mode and to a quantization step size finer than a predetermined quantization step size, i.e. the QpPrimeTsMin, corresponding to no quantization, and, if yes, change the quantization step size to the predetermined quantization step size. QpPrimeTsMin, finally, is governed by a sequence-wise transmitted (in the sequence header) parameter sps_internal_bitdepth_minus_input_bitdepth. The predetermined quantization step size may be dependent on an internal bitdepth and an input bitdepth, e.g., it may be dependent on a difference between the internal bit-depth and the input bit-depth. The decoder/encoder may be configured to deduce a minimum for a quantization step size scale parameter, i.e. the predetermined quantization step size and/or the QpPrimeTsMin, based on the difference, and adhere to the minimum quantization step size scale parameter for portions 100 in a prediction residual transform skip mode. The decoder/encoder may be configured to in adhering to the minimum quantization step size scale parameter for portions 100 coded in a prediction residual transform skip mode, change a signaled quantization step size scale parameter $98_2$ signaled in the data stream 14 for the portions 100, to equal the minimum quantization step size scale parameter in case of the signaled quantization step size scale parameter falling below the minimum quantization step size scale parameter. Note that, when this parameter equals zero (which is a commonly encountered case), QpPrimeTsMin results in a value of 4.

Thus, using element sps_internal_bitdepth_minus_input_bitdepth, element transform_skip_flag, and variable QpPrimeTsMin, it is possible to achieve lossless coding of prediction residual corrected predictive reconstructed picture samples in a specific picture region, such as a coding or transform unit, and a specific color component.

To reach lossless coding even in the presence of in-loop "post-reconstruction" deblocking filtering, the deblocking filtering parameters are also conditioned on the actual quantization parameter qP, in a manner that the filering is, effectively, bypassed when the qP value is less than or equal to QpPrimeTsMin. This is achieved by a corresponding specification of the deblocking parameters ß' and tc' to both equal zero, as shown in Table 2 and equations (1280) and (1282) of item 1.3. Note that this may entail transmitting specific appropriate values for sh_luma_beta_offset_div2 for equation (1280) and sh_luma_tc_offset_div2 for equation (1282) in cases where QpPrimeTsMin of equation (69) is greater than 4 (which results from sps_internal_bitdepth_minus_input_bitdepth>0). The decoder/encoder is configured to infer that one or more predetermined coding options relating to one or more tools of the decoder/encoder for processing a prediction residual corrected predictive reconstruction with respect to the predetermined portion 100 or for prediction residual re-quantization/quantization are to be set 110 so that the one or more tools are disabled with respect to the predetermined portion 100, if the predetermined portion 100 of the picture 12 is coded into the data stream 14 using lossless coding $106_1$, and by deriving 120 the one or more predetermined coding options from the plurality 98 of coding parameters, if the predetermined portion 100 of the picture is coded into the data stream 14 using lossy coding $106_2$.

1.3 Decision Process for Luma Block Edges

Inputs to this process are:
a picture sample array recPicture,
a location (xCb, yCb) specifying the top-left sample of the current coding block relative to the top-left sample of the current picture,
a location (xBI, yBI) specifying the top-left sample of the current block relative to the top-left sample of the current coding block,
a variable edgeType specifying whether a vertical (EDGE_VER) or a horizontal (EDGE_HOR) edge is filtered,
a variable bS specifying the boundary filtering strength,
a variable maxFilterLengthP specifying the maximum filter length,
a variable maxFilterLengthQ specifying the maximum filter length.

Outputs of this process are:
the variables dE, dEp and dEq containing decisions,
the modified filter length variables maxFilterLengthP and maxFilterLengthQ,
the variable $t_C$.

The sample values $p_{i,k}$ and $q_{j,k}$ with i=0 . . . Max(2, maxFilterLengthP), j=0 . . . Max(2, maxFilterLengthQ) and k=0 and 3 are derived as follows:

If edgeType is equal to EDGE_VER, the following applies:

$$q_{j,k} = \text{recPicture}[xCb+xB1+j][yCb+yB1+k] \quad (1273)$$

$$p_{i,k} = \text{recPicture}[xCb+xB1-i-1][yCb+yB1+k] \quad (1274)$$

Otherwise (edgeType is equal to EDGE_HOR), the following applies:

$$q_{j,k} <= \text{recPicture}[xCb+xB1+k][yCb+yB1+j] \quad (1275)$$

$$p_{i,k} = \text{recPicture}[xCb+xB1+k][yCb+yB1-i-1] \quad (1276)$$

The variable qpOffset is derived as follows:
If sps_ladf_enabled_flag is equal to 1, the following applies:
The variable lumaLevel of the reconstructed luma level is derived as follow:

$$lumaLevel=((p_{0,0}+p_{0,3}+q_{0,0}+q_{0,3})>>2), \quad (1277)$$

The variable qpOffset is set equal to sps_ladf_lowest_interval_qp_offset and modified as follows:
for(i=0; i<sps_num_ladf_intervals_minus2+1; i++)
{
if(lumaLevel>SpsLadfIntervalLowerBound[i+1])

$$qpOffset=sps\_ladf\_qp\_offset[i] \quad (1278)$$

else
break
}
Otherwise, qpOffset is set equal to 0.
The variables $Qp_Q$ and $Qp_P$ are set equal to the $Qp_Y$ values of the coding units which include the coding blocks containing the sample $q_{0,0}$ and $p_{0,0}$, respectively.
The variable qP is derived as follows:

$$qP=((Qp_Q+Qp_P+1)>>1)+qpOffset \quad (1279)$$

The value of the variable β' is determined as specified in table 2 based on the quantization parameter Q derived as follows:

$$Q=Clip3(0,63,qP+(sh\_luma\_beta\_offset\_div2<<1)) \quad (1280)$$

where sh_luma_beta_offset_div2 is the value of the syntax element sh_luma_beta_offset_div2 for the slice that contains sample $q_{0,0}$.
The variable β is derived as follows:

$$\beta=\beta'*(1<<(BitDepth-8)) \quad (1281)$$

The value of the variable tc' is determined as specified in table 2 based on the quantization parameter Q derived as follows:

$$Q=Clip3(0,65,qP+2*(bS-1)+(sh\_luma\_tc\_offset\_div2<<1)) \quad (1282)$$

where sh_luma_tc_offset_div2 is the value of the syntax element sh_luma_tc_offset_div2 for the slice that contains sample $q_{0,0}$.
The variable tc is derived as follows:

$$roundOffset=1<<(9-BitDepth) \quad (1283)$$

$$t_C=BitDepth<10?(t_C'+roundOffset)>>(10-BitDepth): t_C'*(1<<(BitDepth-10)) \quad (1284)$$

TABLE 2

Derivation of threshold variables β' and $t_C'$ from input Q

| Q | 0 | 1 | 2 | 3 | 4 | 5 |
|---|---|---|---|---|---|---|
| β' | 0 | 0 | 0 | 0 | 0 | 0 |
| $t_C'$ | 0 | 0 | 0 | 0 | 0 | 0 |
| Q | 6 | 7 | 8 | 9 | 10 | 11 |
| β' | 0 | 0 | 0 | 0 | 0 | 0 |
| $t_C'$ | 0 | 0 | 0 | 0 | 0 | 0 |
| Q | 12 | 13 | 14 | 15 | 16 | 17 |
| β' | 0 | 0 | 0 | 0 | 6 | 7 |
| $t_C'$ | 0 | 0 | 0 | 0 | 0 | 0 |
| Q | 18 | 19 | 20 | 21 | 22 | 23 |
| β' | 8 | 9 | 10 | 11 | 12 | 13 |
| $t_C'$ | 3 | 4 | 4 | 4 | 4 | 5 |
| Q | 24 | 25 | 26 | 27 | 28 | 29 |
| β' | 14 | 15 | 16 | 17 | 18 | 20 |
| $t_C'$ | 5 | 5 | 5 | 7 | 7 | 8 |
| Q | 30 | 31 | 32 | 33 | 34 | 35 |
| β' | 22 | 24 | 26 | 28 | 30 | 32 |
| $t_C'$ | 9 | 10 | 10 | 11 | 13 | 14 |
| Q | 36 | 37 | 38 | 39 | 40 | 41 |
| β' | 34 | 36 | 38 | 40 | 42 | 44 |
| $t_C'$ | 15 | 17 | 19 | 21 | 24 | 25 |
| Q | 42 | 43 | 44 | 45 | 46 | 47 |
| β' | 46 | 48 | 50 | 52 | 54 | 56 |
| $t_C'$ | 29 | 33 | 36 | 41 | 45 | 51 |
| Q | 48 | 49 | 50 | 51 | 52 | 53 |
| β' | 58 | 60 | 62 | 64 | 66 | 68 |
| $t_C'$ | 57 | 64 | 71 | 80 | 89 | 100 |
| Q | 54 | 55 | 56 | 57 | 58 | 59 |
| β' | 70 | 72 | 74 | 76 | 78 | 80 |
| $t_C'$ | 112 | 125 | 141 | 157 | 177 | 198 |
| Q | 60 | 61 | 62 | 63 | 64 | 65 |
| β' | 82 | 84 | 86 | 88 | — | — |
| $t_C'$ | 222 | 250 | 280 | 314 | 352 | 395 |

Aspect 2: Introduction of a New "Global" Lossless Coding Flag

To streamline the VVC configuration for lossless coding ability, it is proposed to introduce a new one-bit flag, to be called lossless coding herein, into the sequence, frame, picture, sub-picture, tile-group, or slice header syntax of an image or video coding bit-stream. In other words, a new "global" (relative to the subblock level) flag is proposed to be introduced, which can have a value of 0 (no lossless coding operation, i. e., normal mode) or 1 (lossless mode) and which controls the operation (activation or deactivation or algorithmic details) of at least two coding tools provided (i. e., specified) by the affected image or video codec. More specifically, the operation of at least 2 of the following list of tools depends on the lossless coding flag:
  entropy coder for any residual (spatial or transform) signal coefficients
  joint inter-component transform (ICT) in terms of transform matrix operation
  smoothing filtering operations of some predictive coding tools (to be disabled)
  in-loop filters: deblocking, shape adaptive offset, adaptive loop filter (ALF), reshaper (disabled)
  quantization of residual spatial or transform coefficients (disabled)

Aspect 3: Desired Effect of "Global" Lossless Coding Flag on Individual Coding Tools This third aspect specifies in detail how the value of the lossless coding flag or the inferred meaning of the transform mode (indicating transform skipping functionality) and QP (indicating a particular step-size), as mentioned in Aspect 1 above, changes the behavior of the entropy coding, inter-component transform, prediction, and in-loop filtering tools for a given picture region or portion associated with said lossless_coding flag or said inferred meaning.

3.0 Quantization

A quantization parameter (QP) equals to four and the usage of the transform skip mode results in the lossless quantization mode of the residual signal. A bitdepth correction may be used when the input bitdepth and the internal bitdeph differs. A difference between the input bitdepth and the internal bitdepth can be realized by signaling the input bitdepth in the high-level syntax. Alternatively, the difference between the input and the internal bitdepth can be transmitted in the high-level syntax. Another alternative is the signaling of the minimum allowed QP for transform skip in the high-level syntax, either absolutely or relative to the base QP.

An embodiment is related to a video decoder configured to perform video decoding from a data stream 14 at an internal bit-depth and video output at an input bit-depth or internal bit-depth. The video decoder is configured to read from the data stream a syntax element which indicates a difference between the internal bit-depth and the input bit-depth. Parallel a video encoder is configured to perform video encoding into a data stream 14 at an internal bit-depth and receive video input at an input bit-depth or internal bit-depth. The video encoder is configured to encode into the data stream 14 the syntax element which indicates the difference between the internal bit-depth and the input bit-depth.

A bit-depth transition may be performed from an internally-reconstructed video version 46 to the input bit-depth. The decoder may be configured to perform this transition before the video output and the encoder may be configured to perform this transition in the prediction-loop 36.

According to an embodiment, the decoder/encoder is configured to deduce a minimum for a quantization step size scale parameter, e.g. the quantization parameter $98_2$, based on the difference, e.g., owing to a difference of non-zero, another QP than 4 may result in lossless coding or almost lossless coding, and adhere to the minimum quantization step size scale parameter for portions of the video coded in a prediction residual transform skip mode. The decoder/encoder is configured to map a quantization step size scale parameter $98_2$ finer than the minimum, e.g., QP<4, to a quantization step size scale parameter $98_2$ equal the minimum to enable a lossless coding. For lossless coding, the minimum might be associated with no quantization 32, 52 or a bypassing or disabling of a quantization 32, 52. The decoder/encoder may be configured to in adhering to the minimum quantization step size scale parameter for video portions 100 coded in a prediction residual transform skip mode, change a signaled quantization step size scale parameter signaled in the data stream 14 for the video portions 100, to equal the minimum quantization step size scale parameter in case of the signaled quantization step size scale parameter falling below the minimum quantization step size scale parameter. The decoder/encoder may adhere to the minimum quantization step size scale parameter merely within video regions 104 for which the data stream 14 signals a lossless coding mode $106_1$.

Another embodiment is related to a video decoder configured to perform video decoding from a data stream 14 at an internal bit-depth and video output at an input bit-depth or internal bit-depth, and read from the data stream 14 a syntax element which indicates a minimum for a quantization step size scale parameter (QP minimum), e.g., owing to a difference of non-zero between internal and input bit-depth, on which difference the decoder might be informed as well, e.g., in addition to the QP minimum, either by way of transmitting the difference or by transmitting both values, i.e. the input bit-depth and the internal bit-depth. Another QP than 4 may result in, or almost in, lossless coding. Parallel, a video encoder may be configured to perform video encoding into the data stream 14 at an internal bit-depth and receive video input at an input bit-depth or internal bit-depth, and encode into the data stream 14 a syntax element which indicates a minimum for a quantization step size scale parameter. The decoder/encoder may be configured to in adhere to the minimum quantization step size scale parameter for video portions 100 coded in a prediction residual transform skip mode, and optionally change a signaled quantization step size scale parameter signaled in the data stream 14 for the video portions 100, to equal the minimum quantization step size scale parameter in case of the signaled quantization step size scale parameter falling below the minimum quantization step size scale parameter. The decoder/encoder may adhere to the minimum quantization step size scale parameter merely within video regions 104 for which the data stream 14 signals a lossless coding mode $106_1$.

Another embodiment is related to a video decoder/encoder configured to derive/encode from/into a data stream 14 an indication of an internal bit-depth and an input bit-depth or a difference between same, perform video decoding/encoding from/into the data stream 14 at the internal bit-depth and the decoder is configured to video output at the input bit-depth and the encoder is configured to receive video input at the input bit-depth. Additionally, the decoder/encoder is configured to check whether the internal bit-depth falls below the input bit-depth and change the internal bit-depth to correspond to the input bit-depth. Optionally, the decoder/encoder is configured to derive/encode from/into the data stream 14 an indication of a lossless coded video portion, and perform the checking and the changing within the lossless coded video portion and use the internal bit-depth, e.g., as derived from the data stream 14, for a lossy coded video portion. The internal bit-depth may be signaled in the data stream be the encoder.

3.1. Entropy Coding

Since lossless coding, e.g. with a QP of 4, typically produces significant higher bitrates compared to lossy coding, the entropy coding engine can switch to a high-throughput mode to prevent processing bottlenecks. This could be done e.g. by using different codes in binarization or processing more bins after binarization in bypass coding mode instead of regular coding mode in CABAC that uses context modelling and binary arithmetic coding.

An embodiment is related to a decoder (encoder), configured to determine for a predetermined portion 100 of a picture 12, whether same is (to be) coded into a data stream 14 using lossless coding $106_1$ or lossy coding $106_2$, and decode (encode) a prediction residual from (into) the data stream 14 for the predetermined portion 100 using binarization of prediction residual data into bin strings and context-adaptive binary entropy decoding (encoding) of the bin strings in a first manner (called residual_ts_coding( ) in Table 1), if the predetermined portion 100 of the picture 12 is (to be) coded into the data stream 14 using lossless coding $106_1$, and in a second manner (called residual_coding( ) in Table 1), if the predetermined portion 100 of the picture 12 is (to be) coded into the data stream 14 using lossy coding $106_2$, wherein the first and second manners differ so that a computational complexity is reduced in the first manner compared to the second manner.

The determination whether the predetermined portion 100 of a picture 12 is coded into a data stream 14 using lossless coding $106_1$ or lossy coding $106_2$ can be based on the data sream 14, for example, like described with regard to the decoder/encoder in FIG. 6 or by reading a portion-wise transform quantization bypass coding flag or differently. According to an embodiment, the decoder is configured to perform the determining by reading from the data stream 14 a lossless coding syntax element, e.g. 102, which indicates whether the predetermined portion 100 of the picture 12, or a predetermined region 104 containing the predetermined portion 100, is coded into the data stream 14 using lossless coding $106_1$ or lossy coding $106_2$ and performing the determination depending on the lossless coding syntax element. The encoder may encode this lossless coding syntax element.

The computational complexity may be reduced in the first manner compared to the second manner by at least one of
a number of bins of the bin strings coded using equiprobability bypass mode is greater in the first manner than in the second manner, and
different binarization codes, e.g. Expontial Golomb code, truncated unary code or the like, being used in the first and second manner.

According to an embodiment, an amount of bins of the bin strings belonging to a unary code or truncated unary code of the bin strings is lower in the first manner than in the second manner.

3.2 Inter-Component Transform (ICT)

The coefficients of the ICT inverse transform matrix do not allow for lossless coding since there is no corresponding forward transform matrix which, in the absence of residual signal quantization, results in perfectly lossless reconstruction. Hence, it is proposed to, when lossless_coding equals 1, a different ICT inverse transform matrix (specified as a list of coefficients or mathematical operations such as shifts or multiplications) is to be employed in the codec than when lossless_coding equals 0 (normal operation). Specifically, when lossless_coding equals zero, the conventional ICT upmix operation, e. g., $cb=c1+c2$, $cr=sign*(c1-c2)$, may be employed, where c1 and c2 are two transmitted residual block signals and cb and cr are the associated output residual signals resulting from the inverse ICT. When lossless_coding equals one, however, a lifting transform [4, 5] or a modulo transform [6] operation may be applied to c1 and c2 instead of the abovementioned operations, which allows for perfect reconstruction of the cb and cr prediction residuals in the absence of quantization and in-loop filtering. A different but equivalent way to describe this perfect reconstruction property is to state that the transform is, mathematically, perfectly invertible even in practical applications running on, e.g., computers where, usually, transform operations use rounding-to-integer steps forbidding mathematically perfect reconstruction. For example, the forward lossless ICT $c1=cb+sign*cr$, $c2=cb-sign*INT(c1/2)$ along with the corresponding inverse lossless ICT $cb'=c2+sign*INT(c1/2)$, $cr'=sign*(c1-cb')$, where INT( ) denotes a floor (round towards minus infinity), ceiling (round towards plus infinity), or rounding (round to nearest integer) operator and sign equals 1 or −1, achieves perfect reconstruction of both cb and cr (i. e., cb'=cb, cr'=cr). Hence, the above inverse lossless ICT operation resulting in cb' and cr' is advantageously applied in the decoder when lossless coding is desired. Note that perfect reconstruction can also be achieved by switching the above forward and inverse lossless operations such that the forward lossless ICT is given by $c1=cr+sign*INT(cb/2)$, $c2=sign*(cb-c1)$ and the corresponding inverse lossless ICT is given by $cb'=c1+sign*c2$, $cr'=c1-sign*INT(cb'/2)$.

Also note that the + and − signs in the above equations may differ in particular implementations while leading to equivalent results (i. e., cb'=cb, cr'=cr). Finally, it is worth noting that slightly different formulations, e. g., a formulation equivalent to the integer mid-side (M/S) processing in HD-AAC, described in [5], may be employed as lossless inverse transform in the decoding process.

A decoder (encoder), according to an embodiment, is configured to determine for a predetermined portion 100 of a picture 12, whether same is (to be) coded into a data stream 14 using lossless coding $106_1$ or lossy coding $106_2$, and perform on a prediction residual 24''', 24'''' or a prediction residual corrected reconstruction 46 (e.g., in a prediction-loop of the encoder) of the predetermined portion 100 a perfectly invertible transform, if the predetermined portion 100 of the picture 12 is coded into the data stream 14 using lossless coding $106_1$, and a non-perfectly invertible transform, if the predetermined portion 100 of the picture 12 is coded into the data stream 14 using lossy coding $106_2$.

The determination whether the predetermined portion 100 of a picture 12 is coded into a data stream 14 using lossless coding $106_1$ or lossy coding $106_2$ can be based on the data stream 14, for example, like described with regard to the decoder/encoder in FIG. 6 or by reading a portion-wise transform quantization bypass coding flag or differently. According to an embodiment, the decoder is configured to perform the determining by reading from the data stream 14 a lossless coding syntax element, e.g. 102, which indicates whether the predetermined portion 100 of the picture 12, or a predetermined region 104 containing the predetermined portion 100, is coded into the data stream 14 using lossless coding $106_1$ or lossy coding $106_2$ and performing the determination depending on the lossless coding syntax element. The encoder may encode this lossless coding syntax element.

The perfectly invertible transform and the non-perfectly invertible transform may be inter-color-component transforms or are spectrally decomposing intra-color-component transforms.

3.3 Smoothing Filters in Some Predictors

For lossless coding with high-bitrates, filters that are applied to the prediction signal to attenuate compression artifacts, e.g. smoothing filters to reduce quantization artifacts, could be not beneficial. So in case of transform skip with quantization skipping, these filters can be disabled for lossless coding.

A decoder (encoder), according to an embodiment, is configured to determine, for a predetermined portion 100 of a picture 12, whether same is (to be) coded into the data stream 14 using lossless coding $106_1$ or lossy coding $106_2$, and derive a prediction signal 26 for the predetermined portion 100 in a first manner, if the predetermined portion 100 of the picture 12 is (to be) coded into the data stream 14 using lossless coding $106_1$, and in a second manner, if the predetermined portion 100 of the picture 12 is (to be) coded into the data stream 14 using lossy coding $106_2$, wherein the first and second manners differ so that the prediction signal 26 is less filtered, e.g. by an interpolation filter, in the first manner than in the second manner or unfiltered in the first manner while being filtered in the second manner.

The determination whether the predetermined portion 100 of a picture 12 is coded into a data stream 14 using lossless coding $106_1$ or lossy coding $106_2$ can be based on the data sream 14, for example, like described with regard to the decoder/encoder in FIG. 6 or by reading a portion-wise transform quantization bypass coding flag or differently. According to an embodiment, the decoder is configured to perform the determining by reading from the data stream 14 a lossless coding syntax element, e.g. 102, which indicates whether the predetermined portion 100 of the picture 12, or a predetermined region 104 containing the predetermined portion 100, is coded into the data stream 14 using lossless coding $106_1$ or lossy coding $106_2$ and performing the determination depending on the lossless coding syntax element. The encoder may encode this lossless coding syntax element.

According to an embodiment, the prediction signal 26 is less filtered in the first manner than in the second manner or unfiltered in the first manner while being filtered in the second manner in terms of low-pass filtering, e.g. the prediction signal 26 has, in a higher frequency half out of an overall spatial frequency spectrum of the prediction signal 26, higher energy when derived based on the first manner than in the second manner.

3.4 In-Loop Filters and Quantization

When lossless_coding equals 1, all in-loop filters (e.g., deblocking, shape adaptive offset (SAO), reshaper) and the quantization are disabled, and their related syntax element(s), incl. their individual sequence or frame-wise activation flags and any QPs or delta-QPs, shall not be present in a coded bit-stream.

A decoder (encoder), according to an embodiment, is configured to determine, for a predetermined portion 100 of a picture 12, whether same is (to be) coded into the data stream 14 using lossless coding $106_1$ or lossy coding $106_2$, and infer that one or more predetermined coding options relating to one or more tools of the decoder (encoder) for processing a prediction residual corrected predictive reconstruction 46 with respect to the predetermined portion 100 or for prediction residual re-quantization 52, 38 (quantization 52) are to be set so that the one or more tools are disabled with respect to the predetermined portion 100, if the predetermined portion 100 of the picture 12 is coded into the data stream 14 using lossless coding $106_1$, and by deriving the one or more predetermined coding options from a plurality 98 of coding parameters, if the predetermined portion 100 of the picture 12 is coded into the data stream 14 using lossy coding $106_2$.

The determination whether the predetermined portion 100 of a picture 12 is coded into a data stream 14 using lossless coding $106_1$ or lossy coding $106_2$ can be based on the data sream 14, for example, like described with regard to the decoder/encoder in FIG. 6 or by reading a portion-wise transform quantization bypass coding flag or differently. According to an embodiment, the decoder is configured to perform the determining by reading from the data stream 14 a lossless coding syntax element, e.g. 102, which indicates whether the predetermined portion 100 of the picture 12, or a predetermined region 104 containing the predetermined portion 100, is coded into the data stream 14 using lossless coding $106_1$ or lossy coding $106_2$ and performing the determination depending on the lossless coding syntax element. The encoder may encode this lossless coding syntax element.

In the following different embodiments of methods are described.

Figure 7:
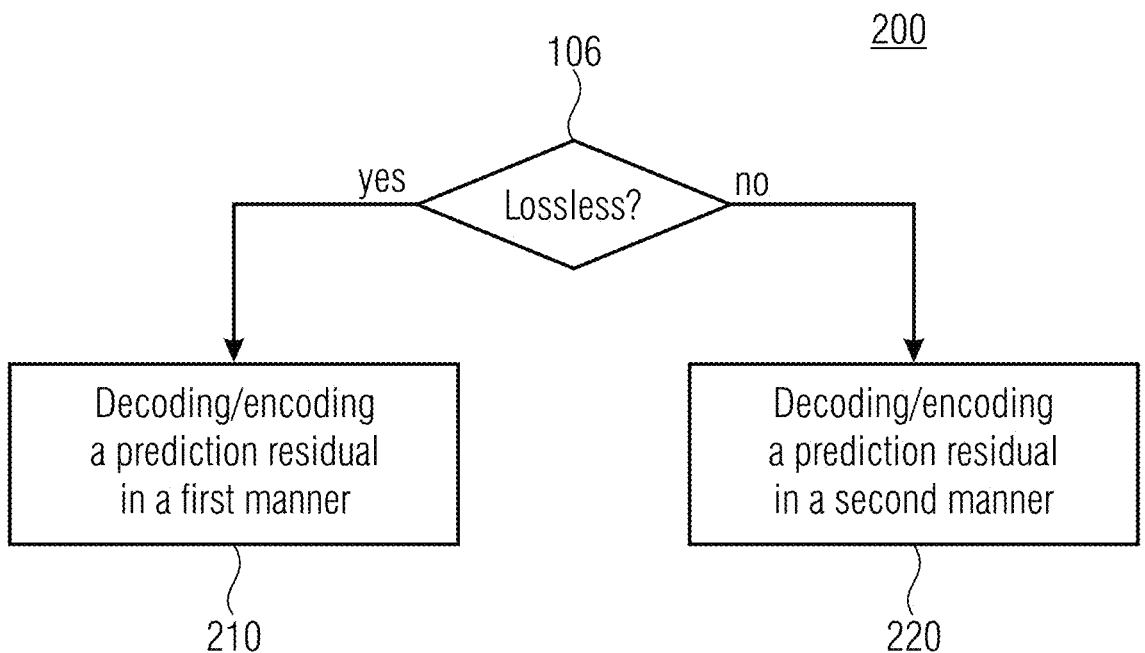
FIG. 7 shows a block diagram of a method using dependent on lossless or lossy coding a different binarization.

FIG. 7 shows a method 200 for decoding (encoding) a picture into a data stream, comprising determining 106 for a predetermined portion of the picture, whether same is (to be) coded into the data stream using lossless coding or lossy coding, and decoding (encoding) a prediction residual from (into) the data stream for the predetermined portion using binarization of prediction residual data into bin strings and context-adaptive binary entropy encoding of the bin strings in a first manner 210, if the predetermined portion of the picture is (to be) coded into the data stream using lossless coding, and in a second manner 220, if the predetermined portion of the picture is (to be) coded into the data stream using lossy coding, wherein the first 210 and second 220 manners differ so that a computational complexity is reduced in the first manner 210 compared to the second manner 220.

Figure 8:
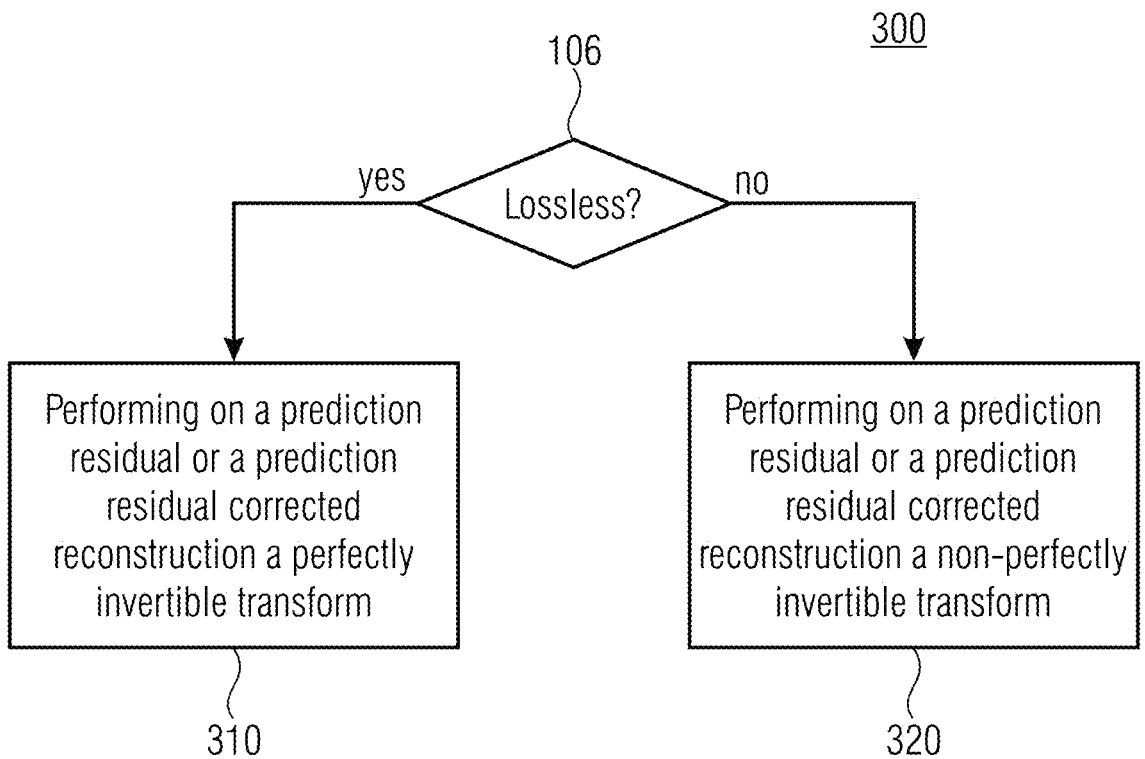
FIG. 8 shows a block diagram of a method using a perfectly invertible transform for lossless coding.

FIG. 8 shows a method 300 for decoding (encoding) a picture from (into) a data stream, comprising determining 106 for a predetermined portion of the picture, whether same is (to be) coded into the data stream using lossless coding or lossy coding, and performing on a prediction residual or a prediction residual corrected reconstruction of the predetermined portion a perfectly invertible transform 310, if the predetermined portion of the picture is (to be) coded into the data stream using lossless coding, and a non-perfectly invertible transform 320, if the predetermined portion of the picture is (to be) coded into the data stream using lossy coding.

Figure 9:
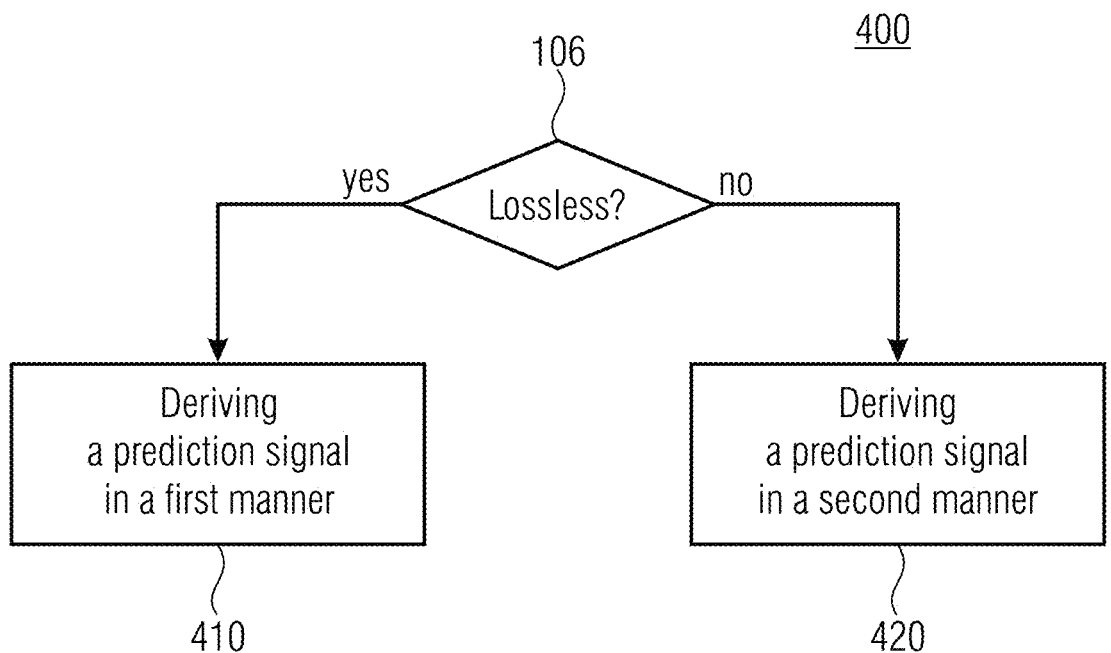
FIG. 9 shows a block diagram of a method for a derivation of a prediction signal dependent on lossless or lossy coding.

FIG. 9 shows a method 400 for decoding (encoding) a picture from (into) a data stream, comprising determining 106 for a predetermined portion of the picture, whether same is (to be) coded into the data stream using lossless coding or lossy coding, and deriving a prediction signal for the predetermined portion in a first manner 410, if the predetermined portion of the picture is (to be) coded into the data stream using lossless coding, and in a second manner 420, if the predetermined portion of the picture is (to be) coded into the data stream using lossy coding, wherein the first and second manners differ so that the prediction signal is less filtered, e.g. using an interpolation filter, in the first manner 410 than in the second manner 420 or unfiltered in the first manner 410 while being filtered in the second manner 420.

Figure 10:
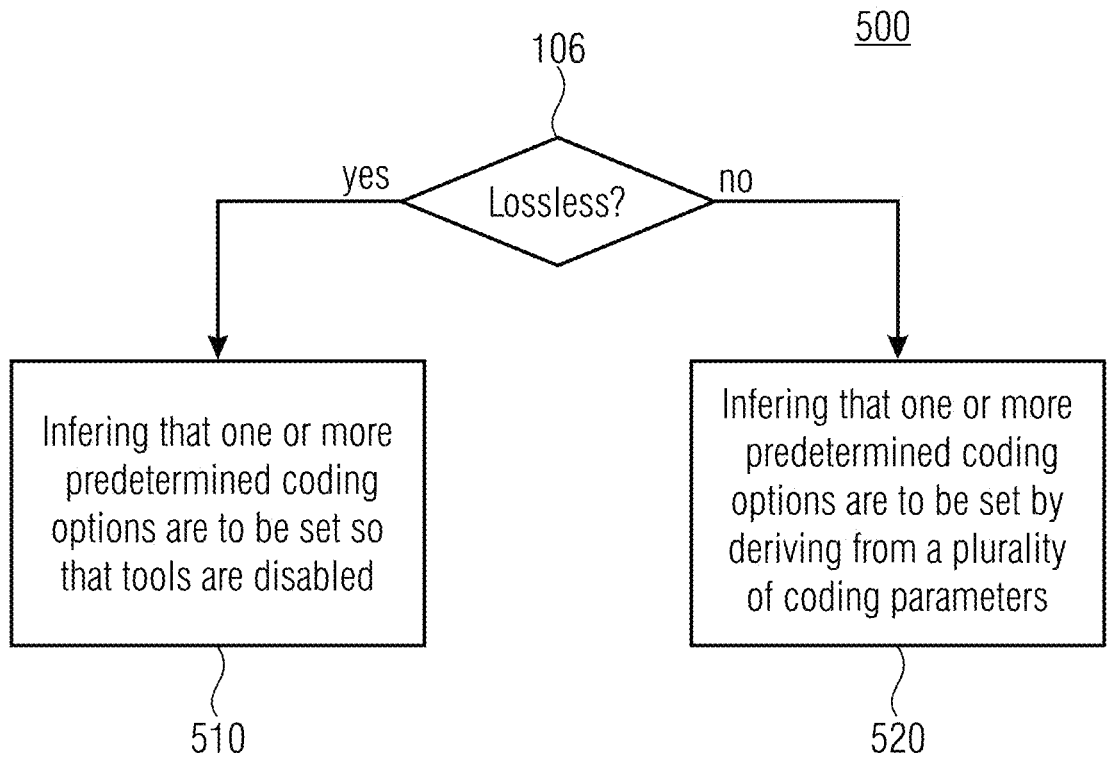
FIG. 10 shows a block diagram of a method for setting one or more predetermined coding options dependent on lossless or lossy coding.

FIG. 10 shows a method 500 for decoding (encoding) a picture from (into) a data stream, comprising determining 106 for a predetermined portion of the picture, whether same is (to be) coded into the data stream using lossless coding or lossy coding, and inferring that one or more predetermined coding options relating to one or more tools of the decoder/encoder for processing a prediction residual corrected predictive reconstruction with respect to the predetermined portion or for prediction residual quantization are to be set so that the one or more tools are disabled 510 with respect to the predetermined portion, if the predetermined portion of the picture is (to be) coded into the data stream using lossless coding, and by deriving 520 the one or more predetermined coding options from the plurality of coding parameters, if the predetermined portion of the picture is (to be) coded into the data stream using lossy coding.

Figure 11A:
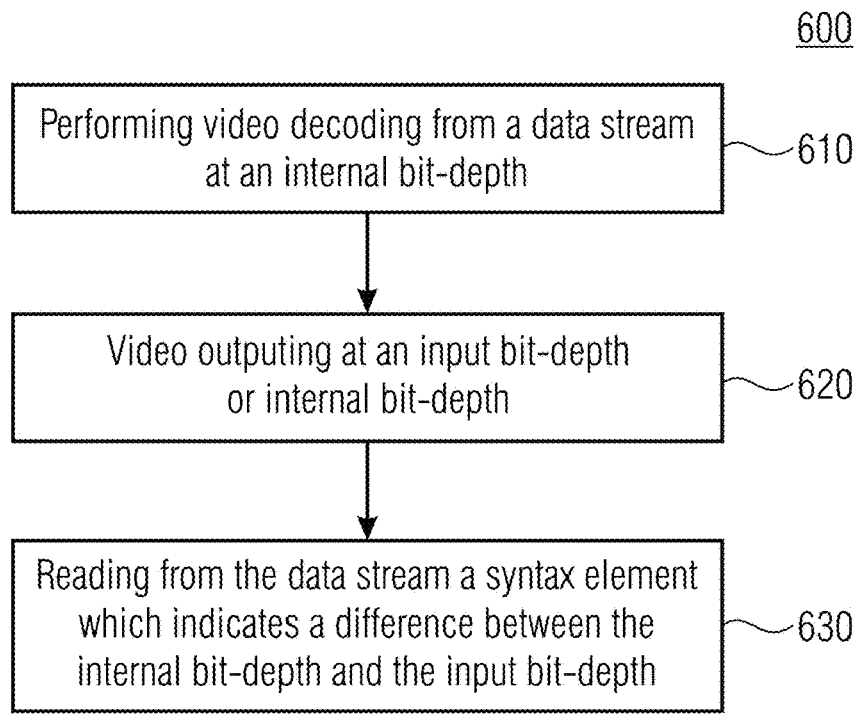
FIG. 11a and FIG. 11b show a block diagram of a method considering an input bit-depth and an internal bitdepth, according to a first embodiment.
Figure 11B:
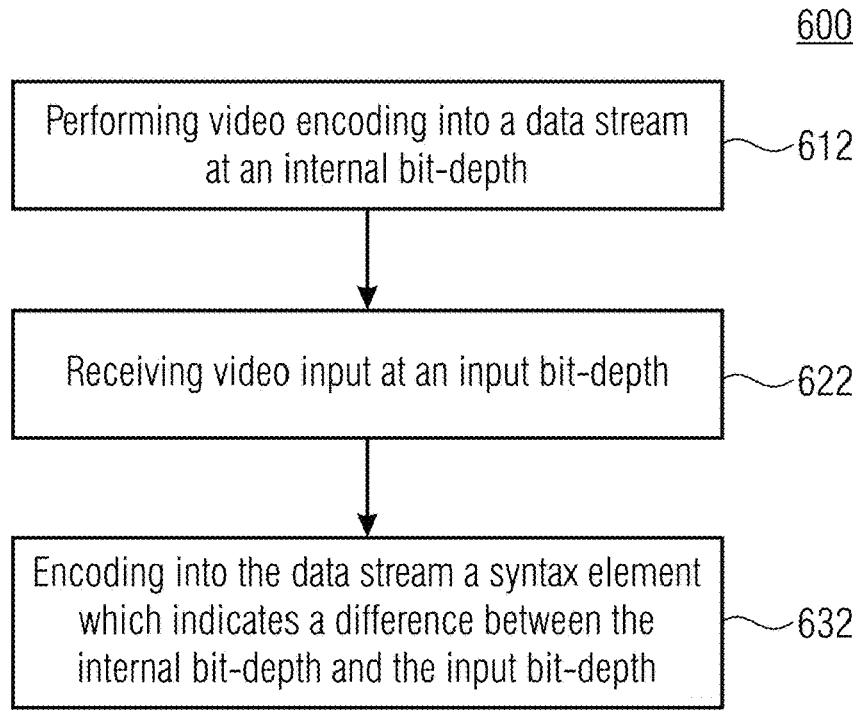

FIG. 11a shows a method 600 comprising performing 610 video decoding from a data stream at an internal bit-depth and video outputing 620 at an input bit-depth or internal bit-depth and reading 630 from the data stream a syntax element which indicates a difference between the internal bit-depth and the input bit-depth. FIG. 11b shows a parallel method 600 comprising performing 612 video encoding into a data stream at an internal bit-depth and receiving 622 video input at an input bit-depth or internal bit depth and encoding 632 into the data stream a syntax element which indicates a difference between the internal bit-depth and the input bit-depth.

Figure 12A:
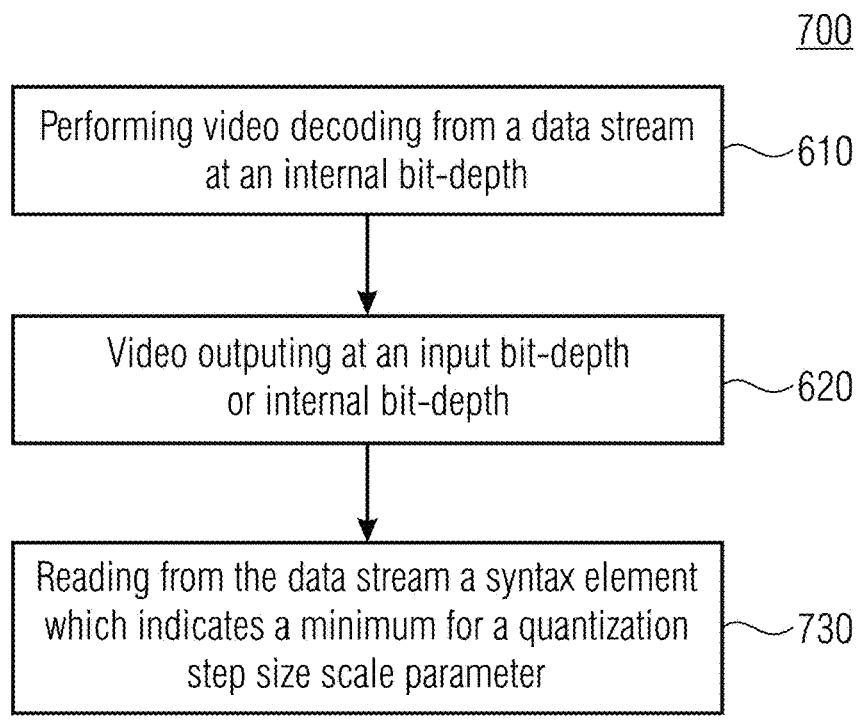
FIG. 12a and FIG. 12b shows a block diagram of a method considering an input bit-depth and an internal bit-depth, according to a second embodiment; and
FIG. 13a and FIG. 13b shows a block diagram of a method considering an input bit-depth and an internal bit-depth, according to a third embodiment.
Figure 12B:
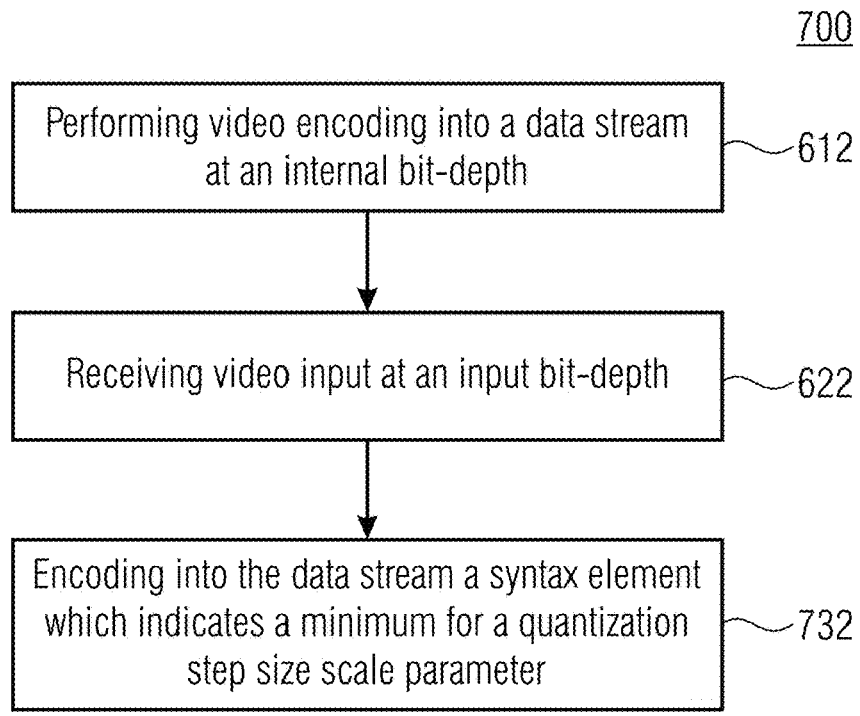

FIG. 12a shows a method 700 comprising performing 610 video decoding from a data stream at an internal bit-depth and video outputting 620 at an input bit-depth or internal bit-depth and reading 730 from the data stream a syntax element which indicates a minimum for a quantization step size scale parameter. FIG. 12b shows a parallel method 700 comprising performing 612 video encoding into a data stream at an internal bit-depth and receiving 622 video input at an input bit-depth or internal bit-depth and encoding 732 into the data stream a syntax element which indicates a minimum for a quantization step size scale parameter.

Figure 13A:
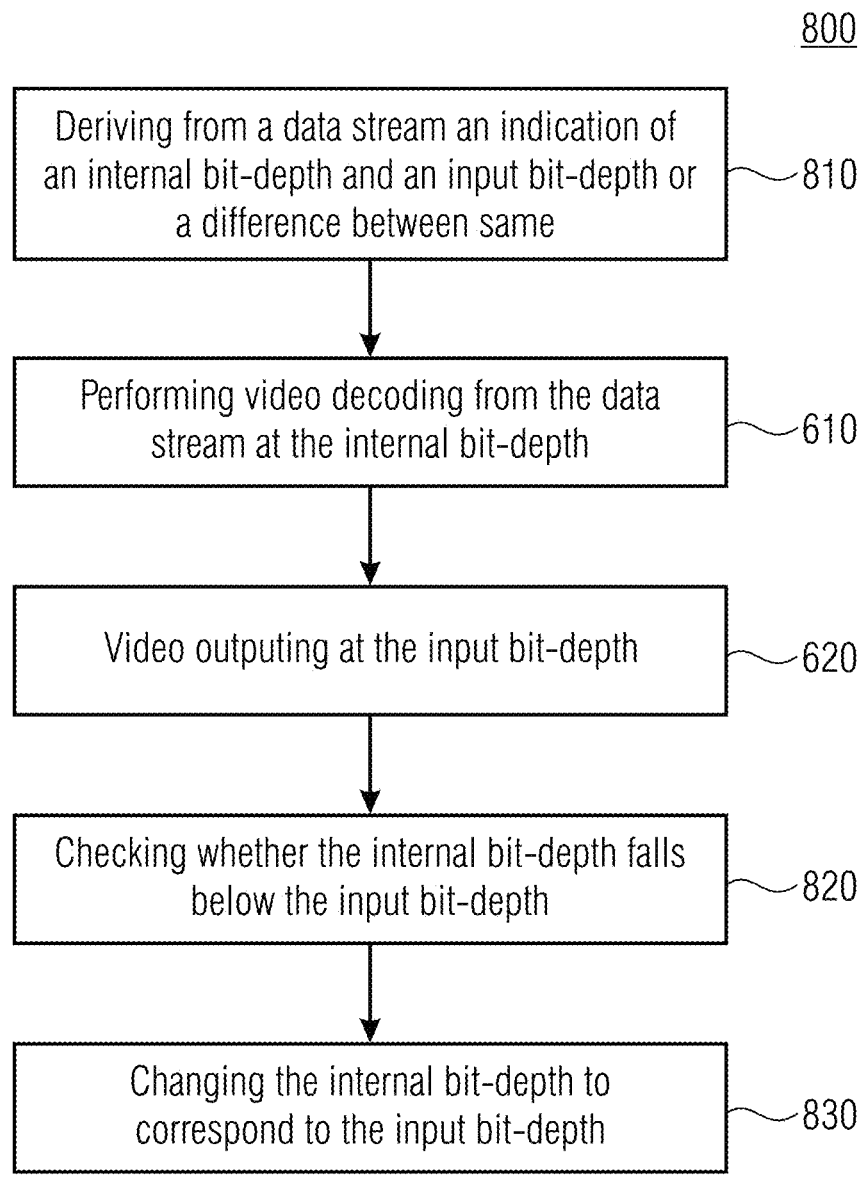
Figure 13B:
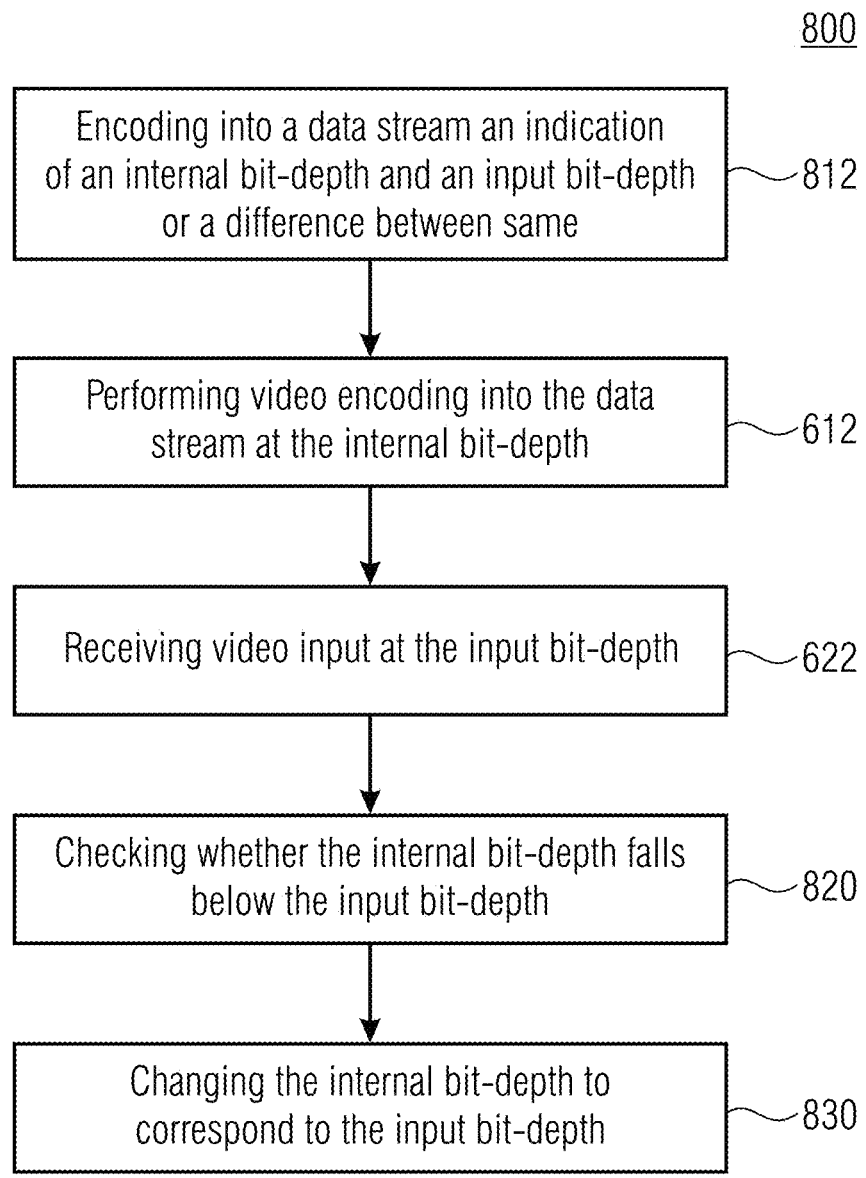

FIG. 13a shows a method 800 comprising deriving 810 from a data stream an indication of an internal bit-depth and an input bit-depth or a difference between same, performing 610 video decoding from the data stream at the internal bit-depth and video outputting 620 at the input bit-depth, checking 820 whether the internal bit-depth falls below the input bit-depth and changing 830 the internal bit-depth to correspond to the input bit-depth. FIG. 13b shows a parallel method 800 comprising encoding 812 into a data stream video an indication of an internal bit-depth and an input bit-depth or a difference between same, performing 612 video encoding into the data stream at the internal bit-depth and receiving 622 video input at the input bit-depth, checking 820 whether the internal bit-depth falls below the input bit-depth and changing 830 the internal bit-depth to correspond to the input bit-depth.

Implementation Alternatives:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ITU-T, Recommendation H.265 and ISO/IEC, Int. Standard 23008-2, "High efficiency video coding," Geneva, Switzerland, February 2018. Online: http://www.itu.int/rec/T-REC-H.265.
[2] JVET/Fraunhofer HHI, "VVCSoftware_VTM: VVC VTM reference software," July 2019. Online: https://vcgit.hhi.faunhofer.de/jvet/VVCSoftware_VTM.
[3] C. Helmrich, H. Schwarz, T. Nguyen, C. Rudat, D. Marpe, and T. Wiegand, "CE7: Joint Chroma Residual Coding with Multiple Modes (Tests CE7-2.1, CE7-2.2)," Joint Video Experts Group, document JVET-O0105, Gothenburg, June 2019.
[4] I. Daubechies and W. Sweldens, "Factoring Wavelet Transforms into Lifting Steps," *J. Four. Anal. Appl.*, September 1996.
[5] R. Geiger, R. Yu, J. Herre, S. Rahardja, S.-W. Kim, X. Lin, and M. Schmidt, "ISO/IEC MPEG-4 High-Definition Scalable Advanced Audio Coding," *J. Aud. Eng. Soc.*, vol. 55, no. 1/2, pp. 27-43, January 2007.
[6] S. Srinivasan, "Modulo transforms—An alternative to lifting," *IEEE Trans. on Signal Processing*, vol. 54, no. 5, pp. 1864-1874, June 2006.

The invention claimed is:

1. A decoder for decoding a picture from a data stream, configured to
  check whether a plurality of coding parameters, which are comprised by the data stream, relate to a predetermined portion of the picture and control a prediction residual transform mode and a quantization accuracy with respect to the predetermined portion, are indicative of a coding parameter setting corresponding to a lossless prediction residual coding,
  responsive to the plurality of coding parameters being indicative of the coding parameter setting corresponding to the lossless prediction residual coding, setting one or more predetermined coding options relating to one or more tools of the decoder for processing a prediction residual corrected predictive reconstruction with respect to the predetermined portion so that the one or more tools are disabled with respect to the predetermined portion.

2. The decoder of claim 1, configured to
  read from the data stream a lossless coding syntax element which indicates whether a predetermined region of the picture, which covers or comprises the predetermined portion, is coded into the data stream using lossless coding or lossy coding, and
  set the one or more predetermined coding options
    so that the one or more tools are disabled with respect to the predetermined portion if the lossless coding syntax element indicates that the predetermined region of the picture is coded into the data stream using lossless coding, and if the plurality of coding parameters are indicative of the coding parameter setting corresponding to the lossless prediction residual coding and
    to a predetermined tool state if the plurality of coding parameters not equal the coding parameter setting corresponding to the lossless prediction residual coding or the lossless coding syntax element indicates that the predetermined region of the picture is coded into the data stream using lossy coding.

3. The decoder of claim 2, configured to determine the predetermined tool state depending on one or more syntax elements in the data stream.

4. The decoder of claim 3, where at least one of the one or more syntax elements is absent from the data stream if the one or more predetermined coding options with respect to the predetermined portion are set so that the one or more tools are disabled with respect to the predetermined portion.

5. The decoder of claim 1, configured to set one or more further coding options with respect to the predetermined portion to a default state responsive to the plurality of coding parameters being indicative of the coding parameter setting corresponding to the lossless prediction residual coding.

6. The decoder of claim 5, wherein the default state represents
  a reduction of a filtering or a disabling of a filtering in terms of low-pass filtering for a derivation of a prediction signal for the predetermined portion; and/or
  a perfectly invertible transform to be performed on the prediction residual signal.

7. The decoder of claim 5, wherein the further coding options relate to
  a binarization of prediction residual data into bin strings and context-adaptive binary entropy decoding of the bin strings;
  a usage of a perfectly invertible transform on a prediction residual or a prediction residual corrected reconstruction of the predetermined portion;
  a disabling or reduction of a filtering for a derivation of a prediction signal for the predetermined portion; and/or
  a disabling of a processing of a prediction residual corrected predictive reconstruction with respect to the predetermined portion or a prediction residual re-quantization.

8. The decoder of claim 1, configured to
  decode a prediction residual from the data stream for the predetermined portion using binarization of prediction residual data into bin strings and context-adaptive binary entropy decoding of the bin strings in a first manner, if the plurality of coding parameters are indicative of the coding parameter setting corresponding to the lossless prediction residual coding, and in a second manner, if the plurality of coding parameters are not indicative of the coding parameter setting corresponding to the lossless prediction residual coding, wherein the first and second manners differ so that a computational complexity is reduced in the first manner compared to the second manner.

9. The decoder of claim 1, configured to
  perform on a prediction residual or a prediction residual corrected reconstruction of the predetermined portion a perfectly invertible transform, if the plurality of coding parameters are indicative of the coding parameter setting corresponding to the lossless prediction residual coding, and a non-perfectly invertible transform, if the plurality of coding parameters are not indicative of the coding parameter setting corresponding to the lossless prediction residual coding.

10. The decoder of claim 1, configured to
  derive a prediction signal for the predetermined portion in a first manner, if the plurality of coding parameters are indicative of the coding parameter setting corresponding to the lossless prediction residual coding, and in a second manner, if the plurality of coding parameters are not indicative of the coding parameter setting corresponding to the lossless prediction residual coding, wherein the first and second manners differ so that the prediction signal is less filtered in the first manner than in the second manner or unfiltered in the first manner while being filtered in the second manner.

11. The decoder of claim 1, configured to
infer that one or more predetermined coding options relating to one or more tools of the decoder for processing a prediction residual corrected predictive reconstruction with respect to the predetermined portion or for prediction residual re-quantization are to be set so that the one or more tools are disabled with respect to the predetermined portion, if the plurality of coding parameters are indicative of the coding parameter setting corresponding to the lossless prediction residual coding, and by deriving the one or more predetermined coding options from the plurality of coding parameters, if the plurality of coding parameters are not indicative of the coding parameter setting corresponding to the lossless prediction residual coding.

12. The decoder of claim 1, configured to
set the one or more predetermined coding options with respect to the predetermined portion
so that the one or more tools are disabled with respect to the predetermined portion if the plurality of coding parameters are indicative of the coding parameter setting corresponding to the lossless prediction residual coding and
to a predetermined tool state if the plurality of coding parameters are not indicative of the coding parameter setting corresponding to the lossless prediction residual coding.

13. The decoder of claim 12, configured to determine the predetermined tool state depending on one or more syntax elements in the data stream.

14. The decoder of claim 1, configured to
read the plurality of coding parameters from the data stream,
check whether the prediction residual transform mode indicated by the plurality of coding parameters corresponds to a transform skip mode and to a quantization step size finer than a predetermined quantization step size corresponding to no quantization, and, if yes, change the quantization step size to the predetermined quantization step size.

15. A method for decoding a picture from a data stream, comprising:
checking whether a plurality of coding parameters, which are comprised by the data stream, relate to a predetermined portion of the picture and control a prediction residual transform mode and a quantization accuracy with respect to the predetermined portion, are indicative of a coding parameter setting corresponding to a lossless prediction residual coding,
responsive to the plurality of coding parameters being indicative of the coding parameter setting corresponding to the lossless prediction residual coding, setting one or more predetermined coding options relating to one or more tools of the decoder for processing a prediction residual corrected predictive reconstruction with respect to the predetermined portion so that the one or more tools are disabled with respect to the predetermined portion.

16. A non-transitory digital storage medium having a computer program stored thereon to perform the method for decoding a picture from a data stream, comprising:
checking whether a plurality of coding parameters, which are comprised by the data stream, relate to a predetermined portion of the picture and control a prediction residual transform mode and a quantization accuracy with respect to the predetermined portion, are indicative of a coding parameter setting corresponding to a lossless prediction residual coding,
responsive to the plurality of coding parameters being indicative of the coding parameter setting corresponding to the lossless prediction residual coding, setting one or more predetermined coding options relating to one or more tools of the decoder for processing a prediction residual corrected predictive reconstruction with respect to the predetermined portion so that the one or more tools are disabled with respect to the predetermined portion,
when said computer program is run by a computer.

* * * * *